US008335651B2

(12) United States Patent
Higginbotham et al.

(10) Patent No.: US 8,335,651 B2
(45) Date of Patent: Dec. 18, 2012

(54) ESTIMATION OF PROPAGATION ANGLES OF SEISMIC WAVES IN GEOLOGY WITH APPLICATION TO DETERMINATION OF PROPAGATION VELOCITY AND ANGLE-DOMAIN IMAGING

(75) Inventors: Joseph H. Higginbotham, Katy, TX (US); Morgan P. Brown, Houston, TX (US); Cosmin Macesanu, Katy, TX (US)

(73) Assignee: Wave Imaging Technology, Inc., Houston, TX (US)

( * ) Notice: Subject to any disclaimer, the term of this patent is extended or adjusted under 35 U.S.C. 154(b) by 500 days.

(21) Appl. No.: 12/587,607

(22) Filed: Oct. 9, 2009

(65) Prior Publication Data
US 2010/0114494 A1 May 6, 2010

Related U.S. Application Data

(63) Continuation-in-part of application No. 12/221,390, filed on Aug. 1, 2008, now Pat. No. 8,082,107.

(51) Int. Cl.
*G01V 1/00* (2006.01)
*G01V 1/28* (2006.01)
(52) U.S. Cl. .......................................... 702/16; 702/14
(58) Field of Classification Search ................. 702/16, 702/14
See application file for complete search history.

(56) References Cited

U.S. PATENT DOCUMENTS

| 5,392,255 | A | * | 2/1995 | LeBras et al. | 367/50 |
| 5,544,126 | A | * | 8/1996 | Berryhill | 367/52 |
| 5,579,281 | A | | 11/1996 | Audebert | |
| 5,640,368 | A | | 6/1997 | Krebs | |
| 5,677,893 | A | * | 10/1997 | de Hoop et al. | 367/50 |
| 6,317,695 | B1 | * | 11/2001 | Zhou et al. | 702/17 |
| 6,493,634 | B1 | * | 12/2002 | Krebs et al. | 702/14 |
| 6,546,339 | B2 | | 4/2003 | Bevc et al. | |
| 6,832,160 | B2 | * | 12/2004 | Vinje | 702/14 |
| 7,460,437 | B2 | * | 12/2008 | Sicking et al. | 367/38 |
| 8,082,107 | B2 | * | 12/2011 | Higginbotham et al. | 702/18 |
| 2002/0128779 | A1 | * | 9/2002 | Kerekes et al. | 702/14 |
| 2006/0203613 | A1 | * | 9/2006 | Thomsen et al. | 367/38 |
| 2007/0162249 | A1 | * | 7/2007 | Lou | 702/147 |
| 2007/0260404 | A1 | * | 11/2007 | Dong et al. | 702/16 |
| 2007/0263487 | A1 | | 11/2007 | Jiao et al. | |
| 2008/0109168 | A1 | * | 5/2008 | Koren et al. | 702/16 |

(Continued)

OTHER PUBLICATIONS

Francois Audebert et al., Migrated focus panels: focusing analysis reconciled with prestack depth migration, SEG Expanded Abstracts, 1992, pp. 961-964.

(Continued)

*Primary Examiner* — Michael Nghiem
(74) *Attorney, Agent, or Firm* — Robert Moll

(57) ABSTRACT

The invention relates to methods and computer-readable medium to implement computing the propagation velocity of seismic waves in the earth. The invention computes the propagation velocity of seismic waves in the earth, which is a condition of obtaining an accurate image of subsurface geology that can be used to prospect for oil and gas deposits. In an embodiment, the method in a host of determining the propagation angles of reflected seismic waves, including inputting data representing reflected seismic waves, inputting a propagation velocity field, computing propagation direction vectors of a source wave field and a receiver wave field using a downward continuation Fourier domain shot record migration using the data representing the reflected seismic waves and the propagation velocity field, and transforming the propagation direction vectors into propagation angles of reflected seismic waves.

14 Claims, 31 Drawing Sheets

U.S. PATENT DOCUMENTS

2010/0061184 A1* 3/2010 Winbow .................. 367/73
2010/0118652 A1* 5/2010 Schneider ................ 367/52

OTHER PUBLICATIONS

Jon F. Claerbout, Imaging the Earth's Interior, Blackwell Scientific Publishing, Inc., Palo Alto, CA USA.

Jon F. Claerbout, Toward a unified theory of reflector mapping, Geophysics, 1971, v. 36, pp. 467-481.

Robert G. Clapp et al., Incorporating geologic information into reflection tomography, Geophysics, 2004, v. 69, pp. 533-546.

Robert G. Clapp et al., Interval velocity estimation in a null-space, Stanford Exploration Project Report #97, pp. 147-156, Stanford, CA USA.

Robert G. Clapp, Geologically constrained migration velocity analysis Thesis, 2001, Stanford University, Stanford, CA USA Ph.D.

C.Hewitt Dix, Seismic velocities from surface measurements, Geophysics, 1955, v. 20, pp. 68-86.

Jean-Pierre Faye and Jean-Paul Jeannot, Prestack migration velocities from focusing depth analysis, SEG Expanded Abstracts, 1986, pp. 438-441.

Jeno Gazdag, et al., Migration of seismic data by phase-shift plus interpolation, Geophysics, 1984, v. 49, pp. 124-131.

Joseph H. Higginbotham et al., Directional depth migration, Geophysics, 1985, v. 50, pp. 1784-1789.

Joseph H. Higginbotham et al., Wave Equation Migration Velocity Focusing Analysis, SEG Expanded Abstracts, 2008, pp. 438-441.

Franklyn K. Levin, Apparent velocity from dipping interface reflections, Geophysics, 1971, v. 36, pp. 510-516.

Scott Mackay and Ray Abma, Imaging and velocity estimation with depth-focusing analysis, Geophysics, 1992, v. 57, pp. 1608-1622.

Tamas Nemeth, Relating depth-focusing analysis to migration velocity analysis, SEG Expanded Abstracts, 1996, pp. 463-467.

Marie L. Prucha et al., Angle-domain common image gathers by wave-equation migration, SEG Expanded Abstracts, 1999, pp.

Paul Sava and Sergey Fomel, Time-shift imaging condition in seismic migration, Geophysics, 2006, v. 71, pp. 209-217.

Paul C. Sava and Sergey Fomel, Angle-domain common-Image gathers by wavefield continuation methods, Geophysics, 2003, v. 68, pp. 1065-1074.

Paul C. Sava, Migration and velocity analysis by wavefield extrapolation, Ph.D. Thesis, 2004, Stanford University, Stanford, CA USA.

Peng Shen et al., Differential semblance velocity analysis by wave-equation migration, SEG Expanded Abstracts, 2003, pp. 2132-2135.

Christiaan C. Stolk et al., Kinematic artifacts in prestack depth migration, Geophysics, 2004, v. 69, pp. 562-575.

M. Turhan Taner and Fulton Koehler, Velocity spectra—digital computer derivation applications of velocity functions, Geophysics, 1969, v. 34, pp. 859-881.

Bin Wang et al., A 3D subsalt tomography based on wave-equation migration-perturbation scans, Geophysics, 2006, v. 71, pp. 1-6.

Biondo Biondi, 3D Seismic Imaging, 2006, SEG, Tulsa, OK USA.

* cited by examiner

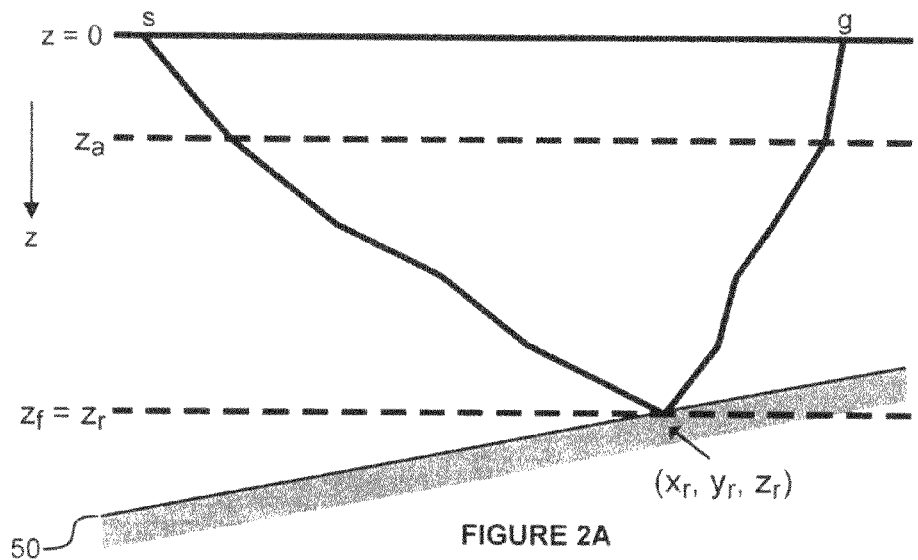
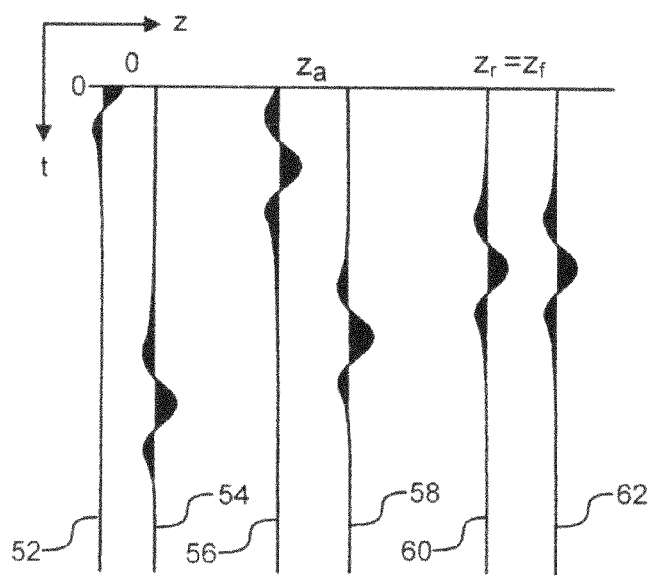
FIGURE 2A
FIGURE 2B
FIGURE 2C

Downward Continuation Migration with Too-fast Migration Velocity

Construction of a Time-shift Gather with Too-fast Migration Velocity
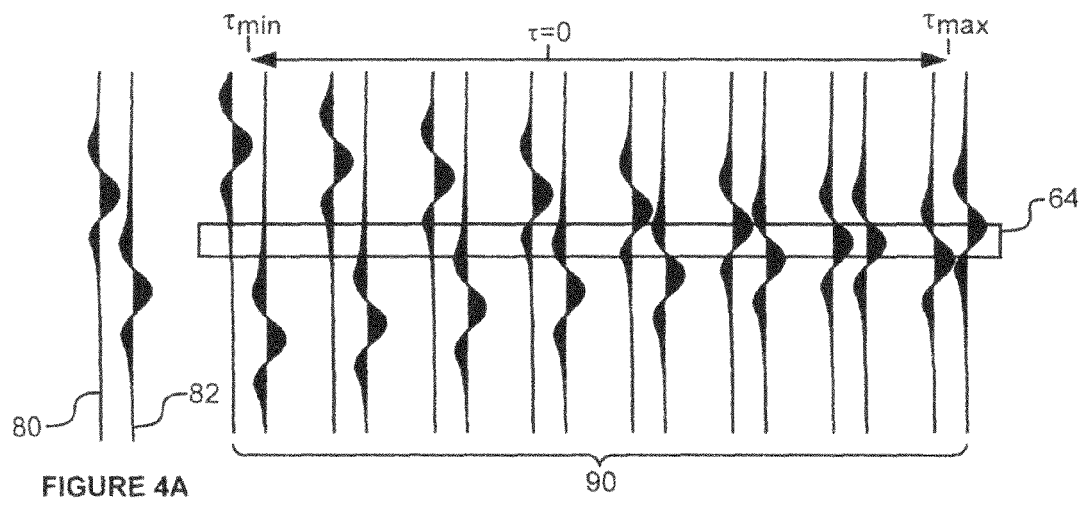
FIGURE 4A
FIGURE 4B
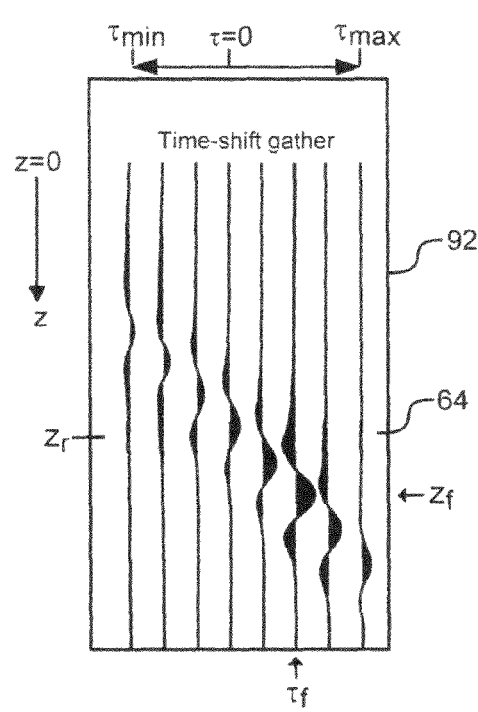
FIGURE 4C Migration Results with Varying Velocity Errors Comparison of Velocity Models Used in Feasibility Test

Incidence Angle, Dip Angle, and Azimuth Angle for a Seismic Reflection

Accumulate Angle of Propagation Information for Time Shift Gathers

ESTIMATION OF PROPAGATION ANGLES OF SEISMIC WAVES IN GEOLOGY WITH APPLICATION TO DETERMINATION OF PROPAGATION VELOCITY AND ANGLE-DOMAIN IMAGING

This application is a continuation-in-part of U.S. application Ser. No. 12/221,390, Methods and Computer-Readable Medium to Implement Computing the Propagation Velocity of Seismic Waves, filed on Aug. 1, 2008, now U.S. Pat. No. 8,082,107 B2 which is incorporated by reference herein.

BACKGROUND

The invention relates to determining propagation angles of reflected seismic waves in complex geology. The invention also relates to using measured propagation angles to enhance determination of propagation velocity and to effect angle-domain imaging of reflected seismic waves to produce an accurate image of earth's geology.

Knowledge of the propagation velocity of seismic waves is required to produce accurate images of underground geology to prospect for oil and gas with the reflection seismic method. The reflection seismic method deploys an array of sound sources (e.g., dynamite, air guns, and vibrating trucks) and receivers (e.g., seismometer or hydrophone) on or below earth's surface to construct an image of underground geology. To gather data to make the image, each sound source produces an explosion or vibration that generates seismic waves that propagate through earth, or initially through water then earth. Underground geologic interfaces, known as "reflectors," will reflect some energy from the seismic waves back to the receivers. Each receiver will record a "trace" at that time. A multi-channel seismic recording system such as the Strata-View manufactured by Geometrics Inc., San Jose, Calif. can be used to collect all of the recorded traces for a given shot. This collection is referred to as a "shot gather."

To map the underground geology, the recorded time of the shot reflection events of each seismic trace will be mapped to the position at which the reflection occurred, using the propagation velocities of seismic waves, which vary with respect to spatial position. This mapping is known as "prestack depth migration." Claerbout, *Toward a unified theory of reflector mapping*, Geophysics v. 36, p. 467 (1971), which is incorporated by reference herein, describes a method of computation known as "downward continuation," which enables prestack migration. Downward continuation is a computation that mathematically moves the recorded seismic traces and simulated seismic source traces into the subsurface to achieve prestack depth migration.

Downward continuation requires an initial estimate of propagation velocity known as the "migration velocity." These estimated propagation velocities can be obtained for instance by the method of stacking velocity analysis developed by Taner and Koehler, *Velocity spectra—digital computer derivation applications of velocity functions*, Geophysics 34, p. 859 (1969), which is incorporated by reference herein.

To form an image from the recorded data at a given depth, downward continuation migration computes the dot product of the downward continued recorded seismic trace and its corresponding downward continued source trace. When an energy peak on the recorded trace is time-coincident with an energy peak on the source trace an image can be formed. This method is known as the "zero time lag correlation imaging condition." It is noted that the term "lag" is also referred to as "shift." If the migration velocity matches the true propagation velocity, prestack migration will form an image of the reflector at the correct location. If the migration velocity differs from the true propagation velocity, prestack migration will form an image of the reflector at an incorrect location.

Sava and Fomel, *Time-shift imaging condition in seismic migration*, Geophysics, v. 71, p. 209 (2006), which is incorporated by reference, state that the zero time lag correlation imaging condition may be generalized to extract energy at a non-zero time lag and used to estimate the propagation velocities. When the migration velocity is incorrect, the energy peak on the downward continued source trace will not match the time of the energy peak on the downward continued recorded trace. By applying the correlation imaging condition at a number of time shifts, other than at zero lag, the amount of misfocusing in time can be computed and related to a velocity error. The generalized imaging condition is known as the "time-shift imaging condition." For a given position on the recording surface and a given time shift, all the traces are summed. The collection of all these summed traces at that position for all the time shifts is known as "a time-shift gather."

In regions with significant geologic complexity, velocity analysis using depth migration (MVA) is superior to methods which operate on prestack data. Migration in general, and depth migration in particular, simplify prestack data by correcting for the effects of offset, reflector dip, and propagation from source to receiver in a heterogeneous medium. When the migration velocity is incorrect, migration will incorrectly position the surface data in depth. Some MVA techniques attempt to flatten Kirchhoff common-offset depth migration gathers by measuring depth error as a function of offset and perturbing the migration velocity accordingly.

Kirchhoff offset gathers exhibit artifacts in complex examples, which are not seen in wave equation depth-migrated images, as described in Stolk and Symes, *Kinematic artifacts in prestack depth migration*, Geophysics v. 69, p. 562 (2004). Claerbout, *Imaging the Earth's Interior* (1985), which is incorporated by reference herein, devised the zero-time/zero-offset prestack imaging condition which forms the basis of most wave equation MVA techniques. Subsurface offset gathers can be converted to angle gathers by slant-stacking as described by Prucha et al, *Angle-domain common image gathers by wave-equation migration*, 69th Annual International Meeting, SEG Expanded Abstracts, p. 824 (1999) and by Sava and Fomel, *Angle-domain common-image gathers by wavefield continuation methods*, Geophysics v. 68, p. 1065 (2003), and have been used for MVA, as described by Clapp, *Incorporating geologic information into reflection tomography*, Geophysics v. 69, p. 533, (2004) and by Sava, Migration and velocity analysis by wavefield extrapolation, Ph.D. thesis, Stanford University (2004). However, the slant stack may itself introduce spurious artifacts. Shen et al., *Differential semblance velocity analysis by wave-equation migration*, SEG Expanded Abstracts, p. 2132 (2003) describe a velocity update method which uses misfocusing in subsurface offset directly.

Another class of MVA methods uses the other wave equation prestack focusing criterion—misfocusing in time—to quantify velocity errors. As described by MacKay and Abma, *Imaging and velocity estimation with depth-focusing analysis*, Geophysics v. 57, p. 1608 (1992), which is incorporated by reference herein, time-shift gathers can be constructed by phase-shifting source and receiver wave fields in shot record migration. While time-shift gathers can be converted to angle gathers, as described by Sava and Fomel, *Time-shift imaging condition in seismic migration, Geophysics*, v. 71, p. 209 (2006), which is incorporated by reference herein, MacKay and Abma measured the depth corresponding to best focusing and invoked a relationship attributed to Faye and Jeannot, *Prestack migration velocities from focusing analysis*, SEG Expanded Abstracts, p. 438 (1986), which is incorporated by reference herein, to relate the measured depth error to a velocity perturbation. The technique has small reflector dip and small offset assumptions. Audebert and Diet, *Migrated focus panels: Focusing analysis reconciled with prestack depth migration*, SEG Expanded Abstracts, p. 961 (1992), which is incorporated by reference herein, outline an approach to partially overcome these limitations.

In the 1990's, one of the inventors, Dr. Higginbotham, developed a method of computing the propagation velocity of seismic waves in earth. The method assumed a migration velocity, generated time shift gathers using a shot record downward continuation depth migration and the time-shift imaging condition, and converted the time shift gathers to semblance gathers. The energy peaks on the semblance gathers corresponded to the amount of misfocusing in time. The magnitude of the misfocusing in time was used to update the migration velocity. The method incorrectly assumed that a time shift corresponded to zero offset travel time. The method computed inaccurate values of the propagation velocity of seismic waves in the presence of reflector dip and source-receiver offset, and it was not understood how to increase its accuracy. Further, the earth's complex geology refracts reflected seismic waves, which makes it difficult to measure the dip angle of a reflector and the incidence angle of a reflected seismic wave at the reflector, which is related to source-receiver offset.

SUMMARY OF THE INVENTION

The invention solves the problem of obtaining an accurate measure of the true propagation velocity which can be enhanced by obtaining the propagation angles of seismic waves in the earth. This results in an accurate image of subsurface geology that can be used to prospect for oil and gas deposits.

The invention provides methods and computer-readable medium of computing the propagation velocity of seismic waves in earth, comprising: providing an estimate of the propagation velocity; generating a time shift gather using a depth migration at a plurality of locations of the earth; converting each of the time shift gathers to a semblance gather; transforming each semblance gather into a velocity gather whose energy peaks represent a root-mean-square average of the propagation velocity along the forward and backward path between earth's surface and a point of the subsurface geology; and converting the energy peaks to the propagation velocity.

The invention also provides a method of computing a propagation velocity of seismic waves in earth, comprising: providing an estimate of the propagation velocity; generating a time shift gather using the depth migration at a plurality of locations of the earth; transforming each time shift gather into a velocity gather whose energy peaks represent a root-mean-square average of the propagation velocity along the forward and backward path between earth's surface and a point of the subsurface geology, and converting the energy peaks to the propagation velocity.

The invention relates to a velocity estimation technique which uses the time-shift imaging condition for wave equation prestack depth migration. The migration time-shift parameter is converted to a perturbation in RMS velocity, which can be converted to interval velocity. The invention can resolve velocity errors in the presence of subsurface complexity that would hamper velocity analysis with surface data. Moreover, it has no dip or offset limitations for constant velocity and weak dip limitations for varying velocity.

The invention also relates to a computer-readable medium and a method of determining the propagation angles of reflected seismic waves, including inputting data representing reflected seismic waves, inputting a propagation velocity field, computing propagation direction vectors of a source wave field and a receiver wave field using a downward continuation Fourier domain shot record migration using the data of the reflected seismic waves and the propagation velocity field, and transforming the propagation direction vectors into propagation angles of reflected seismic waves.

The invention also relates to a computer-readable medium and a method of determining a three-dimensional image of earth's geology, including inputting data representing reflected seismic waves, inputting a propagation velocity field, computing propagation direction vectors of a source wave field and a receiver wave field using a downward continuation Fourier domain shot record migration using the data of the reflected seismic waves and the propagation velocity field, transforming the propagation direction vectors into propagation angles of reflected seismic waves, and generating a three-dimensional image for each shot record using an angle-dependent imaging condition for the shot record migration, wherein an amplitude and a set of propagation angles is associated with each point in the image.

BRIEF DESCRIPTION OF THE FIGURES

FIGS. 2A-2C illustrate downward continuation migration when the correct migration velocity is used.

FIGS. 4A-4C illustrate construction of a time-shift gather when an incorrect migration velocity is used.

DETAILED DESCRIPTION OF THE PREFERRED EMBODIMENTS

Figure 1:
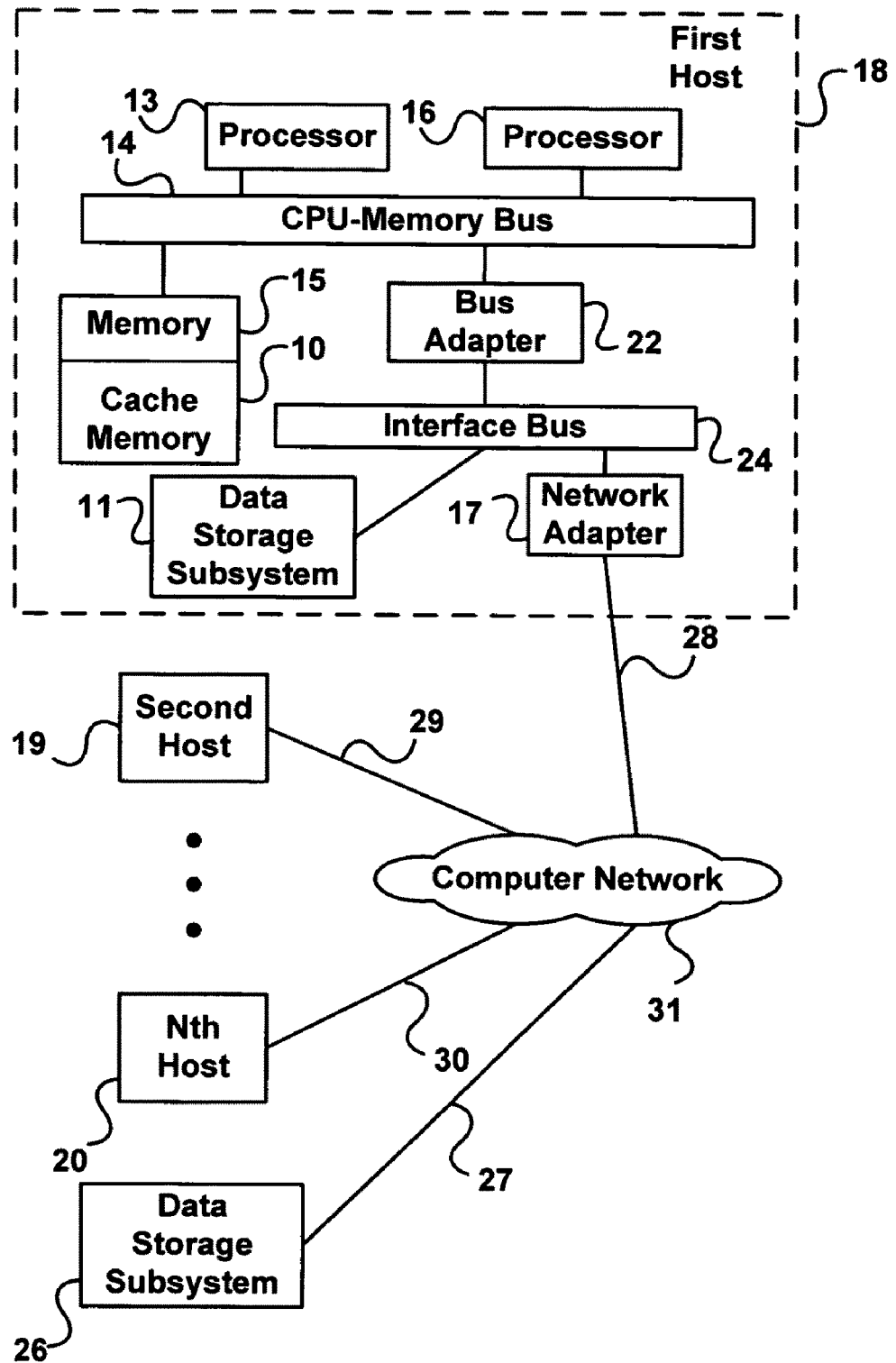
FIG. 1 illustrates a computer for implementing the methods of the invention.

The following description includes the best mode of carrying out the invention. The detailed description illustrates the principles of the invention and should not be taken in a limiting sense. The scope of the invention is determined by reference to the claims. Each part (or step) is assigned its own part (or step) number throughout the specification and drawings. Because some flow charts don't fit in a single drawing sheet encircled capital letters (e.g., "L") show how the flow charts connect (e.g., L connects the flowcharts of FIGS. 22 and 23). The punctuation mark ' and apostrophe ' mean prime wherever they appear in the drawings and specification.

FIG. 1 illustrates a cluster of hosts that can execute the methods in software as described below. Each host is a computer that can communicate with data storage subsystems 11 and 26 (e.g., a disk array and/or solid state memory) and with each other. Hennessy and Patterson, *Computer Architecture: A Quantitative Approach* (2006), and Patterson and Hennessy, *Computer organization and Design: The Hardware/Software Interface* (2007) describe computer hardware and software, storage systems, caching, and networks and are incorporated by reference.

As shown in FIG. 1, a first host 18, which is representative of the second host 19 through Nth host 20, includes a motherboard with a CPU-memory bus 14 that communicates with dual processors 13 and 16. The processor used is not essential to the invention and could be any suitable processor such as the Intel Pentium processor. A processor could be any suitable general purpose processor running software, an ASIC dedicated to perform the operations described herein or a field programmable gate array (FPGA). Also, one could implement the invention using a single processor in each host or more than two processors to meet various performance requirements. The arrangement of the processors is not essential to the invention. Data is defined as including user data, instructions, and metadata. The processor reads and writes data to memory 15 and/or data storage subsystem 11 and 26. Each host includes a bus adapter 22 between the CPU-memory bus 14 and an interface bus 24. A computer-readable medium (e.g., storage device, CD, DVD, floppy card, USB storage device) can be used to encode the software program instructions described in the methods below.

A seismic survey may contain hundreds of thousands of shot gathers resulting in a data set greater than one terabyte. Our method of computing the propagation velocity (described below) can be implemented on one host having a processor, but preferably uses many hosts each with a plurality of processors to image the shot gathers in parallel. In an embodiment, the method is implemented on at least 20 hosts, each having four processors. In the embodiment, each processor on each slave host communicates with a processor on a master host with data flowing between the master and the slave hosts throughout the computation. Data used by our method is usually stored locally on the slave hosts. After the work on each slave host completes, its portion of the output is summed into a single file on the master host. The SeisPak® software owned by Chevron Corporation, San Ramon, Calif. and licensed to the applicants is a suitable software environment for implementing the method described below. SeisPak® uses the open source Parallel Virtual Machine (PVM) software package distributed by Oak Ridge National Laboratory, Oak Ridge, Tenn. to implement the parallel computations described above.

Each host runs an operating system such as Linux, UNIX, a Windows OS, or another suitable operating system. Tanenbaum, *Modern Operating Systems* (2008) describes operating systems in detail and is hereby incorporated by reference. Bovet and Cesati, *Understanding the Linux Kernel* (2005), and Bach, *Design of the Unix Operating System* (1986) describe operating systems in detail and are incorporated by reference herein.

FIG. 1 shows that the first host 18 includes a CPU-memory bus 14 that communicates with the processors 13 and 16 and a memory 15 which is connected to memory cache 10. The first host 18 communicates through the network adapter 17 over a link 28 with a computer network 31 with other hosts. Similarly, the second host 19 communicates over link 29 with the computer network 31, and the Nth host 20 communicates over link 30 with the computer network 31. In sum, the hosts 18, 19 and 20 communicate with each other and with the computer network 31. The link 27, the link 29, the link 30, and the computer network 31 can be implemented using a suitable known bus, SAN, LAN, or WAN technology such as Fibre Channel, SCSI, InfiniBand, or Ethernet, and the technology implemented is not essential to the invention. See Kembel, *The FibreChannel Consultant, A Comprehensive Introduction* (1998), Kembel, *The FibreChannel Consultant, Arbitrated Loop* (1996-1997) The FibreChannel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated by reference herein.

FIGS. 2A-2C and FIGS. 3A-3C illustrate methods of applying downward continuation for prestack depth migration with the zero time lag correlation imaging condition. FIGS. 2A-2C illustrate the method when the migration velocity equals the true propagation velocity.

Figure 5:
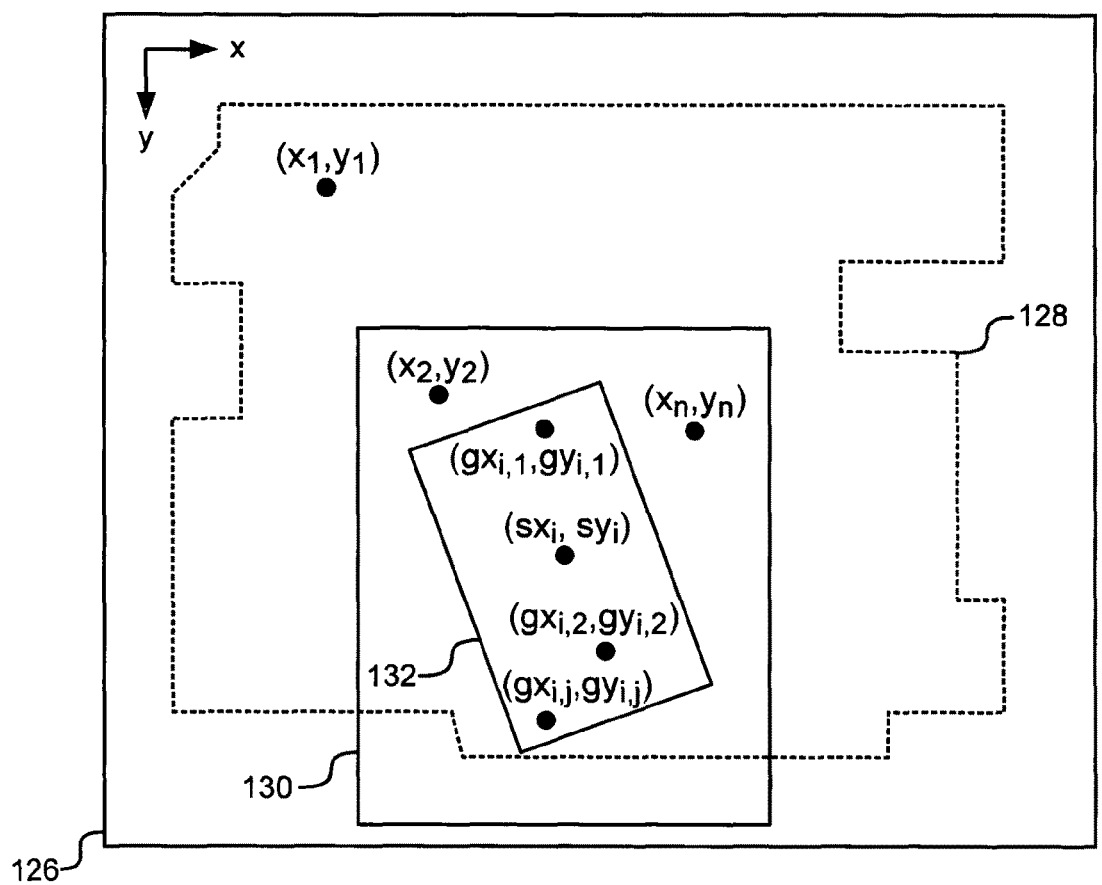
FIG. 5 illustrates a seismic survey geometry and a shot image aperture.

In FIG. 2A, dipping geologic interface 50 produces a seismic reflection which is recorded as a seismic trace (FIG. 2B) at the depth z=0, which can be on or below earth's surface. The voltage of the receiver plots the seismic energy as a function of time t. A simulated source trace 52 is also shown in FIG. 2B. The energy peak of the simulated source trace 52 will lie at t=0 when z=0. The source generating a seismic wave and the receiver which generates the voltage indicative of the wave's reflected energy records its travel time at two-dimensional surface coordinate vectors s=[sx, sy] and g=[gx, gy] as shown in FIG. 5. The simulated source trace 52 is assumed to lie at the position s. The vector connecting the source position s and the receiver position g, referred to as the "offset" vector, can be oriented at an arbitrary azimuth with respect to the (x, y) axis as shown in FIG. 5.

As shown in FIG. 2B, the simulated source trace 52 and the recorded trace 54 are downward continued in depth to some depth $z=z_a>0$, producing traces 56 and 58. The energy peak of the downward continued simulated source trace 56 is moved to a later time. The energy peak of the downward continued recorded trace 58 is moved to an earlier time. At the focusing depth $z_f$ the energy peak of the downward continued simulated source trace 60 and the energy peak of the downward continued recorded trace 62 are coincident in time. Because the migration velocity corresponds to the true propagation velocity, the focusing depth, $z_f$, is the same as the true reflector depth, $z_r$.

FIG. 2C illustrates applying the zero time lag imaging condition 64 to create a depth image trace 66. To form an image at depth z=0, the value corresponding to the dot product of the traces 52 and 54 is placed on the depth image trace at depth z=0. The image at $z=z_a$ is formed by applying the imaging condition 64 to the traces 56 and 58. The image at $z=z_r$ is formed by applying the imaging condition 64 to the traces 60 and 62. Because the migration velocity equals the true propagation velocity, the energy peak of the image trace reaches a maximum at the true reflector depth $z=z_r$.

Figure 3A:
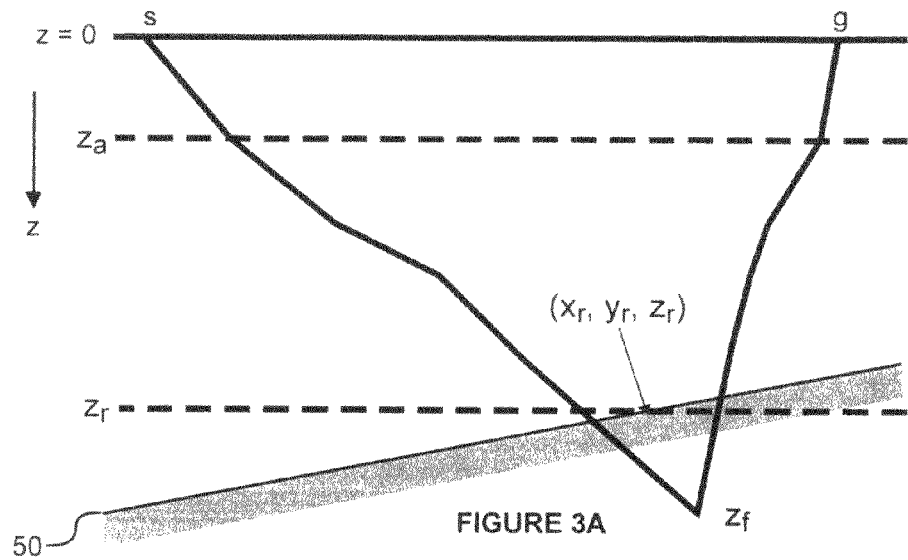
FIGS. 3A-3C illustrate downward continuation migration when an incorrect migration velocity is used.
Figure 3B:
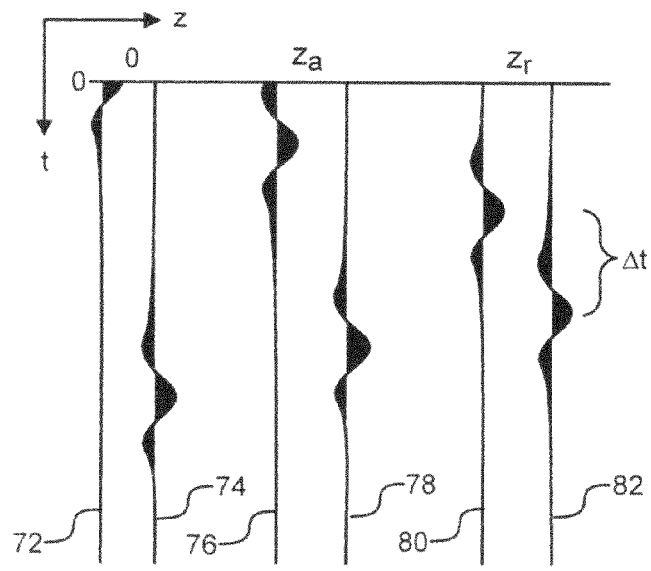
Figure 3C:
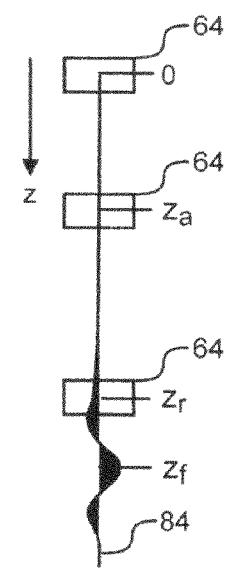

FIGS. 3A-3C illustrate the same method depicted in FIGS. 2A-2C, but in the situation where the migration velocity is faster than the true propagation velocity.

As shown in FIG. 3A, the migration velocity is too fast, which causes the focusing depth $z_f$ to be greater than the true reflector depth $z_r$.

FIG. 3B illustrates the same method depicted in FIG. 2B. The downward continuation of a simulated source trace 72 produces a trace 76 at $z_a$ and a trace 80 at $z_r$. The downward continuation of a recorded trace 74 produces a trace 78 at $z_a$ and a trace 82 at $z_r$. Because the migration velocity is too fast, the energy peaks of the trace 80 and trace 82 are not time-coincident but separated by time $\Delta t$.

FIG. 3C illustrates the same method depicted in FIG. 2C. The zero time lag correlation imaging condition 64 is applied at each depth. Because the migration velocity is too fast, the energy peak of the depth image trace 84 is deeper than the true reflection depth $z_r$.

FIGS. 4A-4C illustrate applying the time-shift imaging condition to the downward continued traces 80 and 82 (FIG. 4A) when the migration velocity is too slow.

As shown in FIG. 4B, an ensemble of shifted traces 90 is generated by applying opposing time shifts $\tau$ ranging from $\tau_{min}$ to $\tau_{max}$ to the trace pair 80 and 82 shown in FIG. 4A. The zero time lag correlation imaging condition 64 is applied to each of the shifted trace pairs. In this case, at $\tau>0$ the energy peaks of the traces in the trace pairs are time coincident.

FIG. 4C shows a time-shift gather 92. The shaded row of the time-shift gather at $z=z_r$ is filled by applying the time-shift imaging condition 64 to each trace pair in the ensemble of shifted traces 90 shown in FIG. 4B. The time-shift gather is filled for other depth levels generating a slanting seismic event in the $(z, \tau)$ plane for each reflector. For a reflector, the energy of the slanting seismic event will be largest at the focusing depth $z_f$. Corresponding to the focusing depth $z_f$ is a focusing time shift $\tau_f$. Because the migration velocity is incorrect, the focusing time shift $\tau_f$ is not zero.

The magnitude of the focusing time shift $\tau_f$ can be used in an embodiment to approximate the velocity error which caused the focusing time shift to deviate from zero. The estimated velocity error is then used to update the migration velocity to better approximate the propagation velocity.

FIG. 5 illustrates the geometry of a seismic survey and a shot record migration aperture. The seismic survey includes a collection of shot gathers. Each shot gather consists of a source (or shot). The ith shot is located at position vector $[sx_i, sy_i]$. A collection of receivers records seismic reflections from each source. Three such receivers corresponding to the ith shot are shown at $[gx_{i,1}, gy_{i,1}]$, $[gx_{i,2}, gy_{i,2}]$, and $[gx_{i,j}, gy_{i,j}]$, where the index j represents the jth receiver belonging to the ith shot. A polygon 132 contains all the receivers corresponding to the ith shot. Although shown as a rectangle, the polygon is generally irregular. A polygon 128 contains all the sources and receivers. The polygon is typically irregular in shape due to constraints such as oilfield equipment and irregularities in land ownership. The shot record migration produces an independent seismic image for each shot gather.

To reduce computational time, a shot image aperture 130 can be defined for each shot gather. The shot image aperture 130 is usually a rectangle for simple implementation. Whatever its geometric shape, the shot image aperture 130 should contain the source and all receivers in the shot gather, and enough "padding" on the edges to image seismic energy reflecting from dipping reflectors. The master image extent 126 contains all shot image apertures and is generally rectangular for simple implementation.

The location of a time-shift gather in general is denoted by $(x_n, y_n)$. Three such locations are shown at $(x_1, y_1)$, $(x_2, y_2)$, and $(x_n, y_n)$. Two of the three time-shift gather locations are contained in the shot image aperture 130 of the ith shot. Energy from the ith shot image will only contribute to time-shift gather locations contained in the shot image aperture 130. The spacing density and regularity of the time-shift gathers is flexible but can be specified on a regular grid for simplicity.

Figure 6:
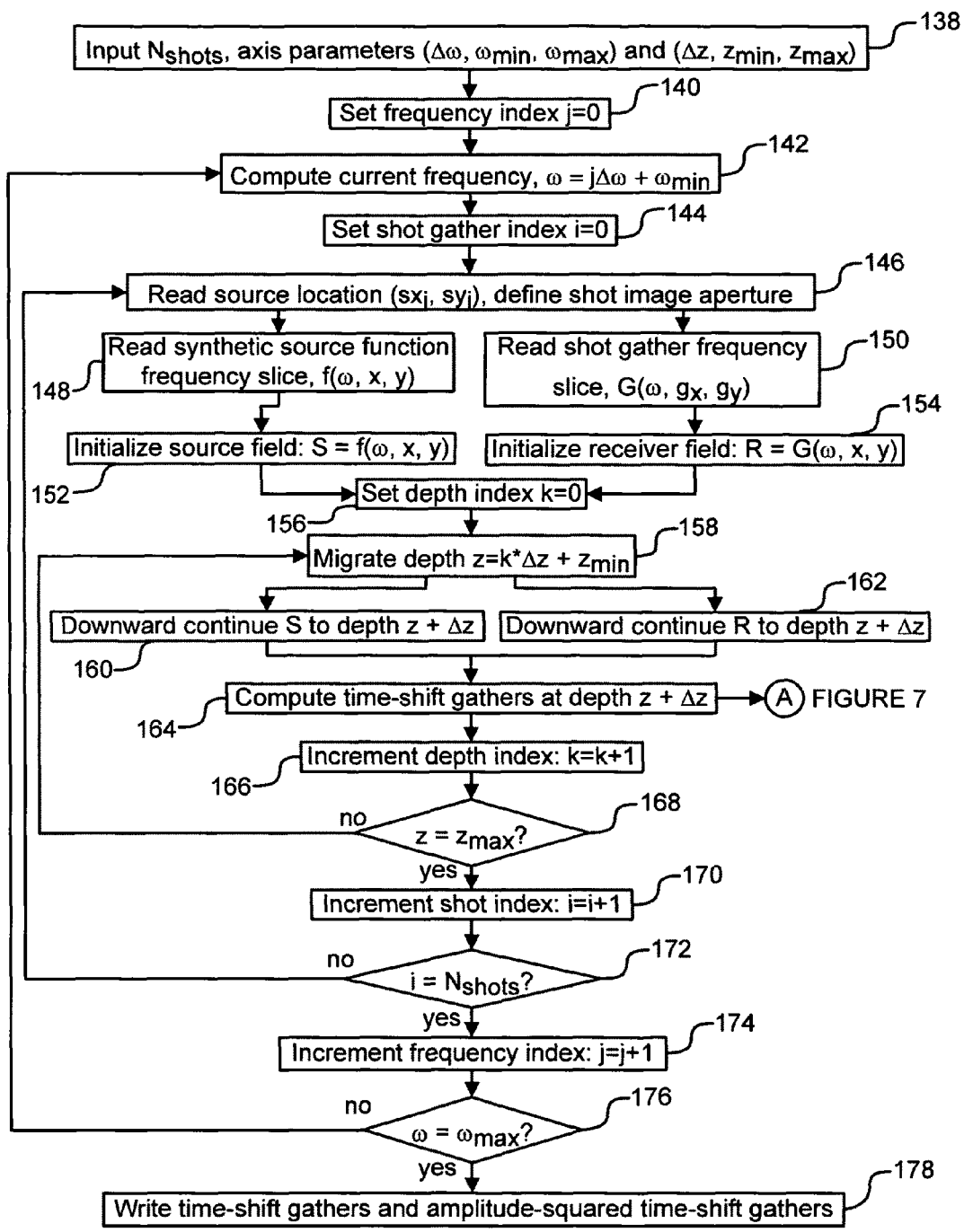
FIG. 6 illustrates a method of downward continuation shot record migration.

FIG. 6 illustrates a method of shot record migration to generate time-shift gathers as implemented in software executable by the host. A discrete Fourier transform is applied to the time axis of every trace in the collection of input shot gathers. The shot record migration method includes three nested loops: over all frequencies, over all shot gathers, and over all depths. It is known that summation of the frequency components of a Fourier-transformed signal is equivalent to extraction of the original signal at zero time. The zero lag correlation imaging condition is applied in this manner for efficient computation. Each shot gather is imaged independently with a pre-defined aperture then inserted and summed into the master image as shown in FIG. 5. For each frequency and each shot, the image is formed by downward continuation from the minimum depth to the maximum depth.

As shown in FIG. 6, at step 138 the user inputs the parameters for the frequency axis, the output image's depth axis, and the number of shot gathers $N_{shots}$ in the host. It is simplest to parameterize the axes by the minimum value, the spacing between samples, the maximum value, and an integer index. The minimum frequency is $\omega_{min}$, the spacing between adjacent frequencies is $\Delta\omega$, and the maximum frequency is $\omega_{max}$. Similarly, the minimum depth is $z_{min}$, the spacing between adjacent depths is $\Delta z$, and the maximum depth is $z_{max}$. Implementations using irregular sampling in depth may yield a significant performance advantage, because seismic velocities generally increase with depth and high frequencies in the data are attenuated allowing less frequent sampling as the seismic waves propagate into the earth.

At step 140, the method initializes the frequency loop index j to 0. At step 142 the method computes the current frequency by the linear relation $\omega=j*\Delta\omega+\omega_{min}$. At step 144, the method initializes the shot gather index i to 0. At step 146, the method reads the location of the ith source, $(sx_i, sy_i)$ from the trace header of any trace in the current shot gather. Those skilled in the art are familiar with the concept of trace headers. The SEG-Y format is one example of a data format which uses trace headers. At step 146, the method also defines the spatial extent of the shot image aperture 130 relative to $(sx_i, sy_i)$. At step 148, the method reads a Fourier-transformed synthetic source function for the current frequency. Because the source function depends on three variables, extraction of one frequency value is a "frequency slice" from the three-dimensional source function cube. Although this synthetic source function may have finite spatial extent, it can be implemented as a point source at $(sx_i, sy_i)$, and is defined either as a "spike" at time=0 or as a more complicated function in time, which reproduces the behavior of the actual source function of the shot. At step 152, the method initializes the source wave field S, which is a two-dimensional array corresponding to the shot image aperture, by interpolating the synthetic source function into the appropriate location on S. At step 150, the method reads a frequency slice from the current Fourier-transformed shot gather. At step 154, the method initializes the receiver wave field R as it did with the source wave field at step 152 by interpolating the shot gather frequency slice read at step 150 into the appropriate location. The receiver wave field R is also a two-dimensional array with the same size as source wave field S. The initialization of receiver wave field R and source wave field S is assumed to happen at depth z=0, where the sources and receivers are assumed to be located. Generalization of the algorithm to a non-flat acquisition datum is possible, as described in Higginbotham, *Directional depth migration, Geophysics*, v. 50, p. 1784 (1985), which is incorporated by reference herein.

At step 156, the method executes a loop over depth that begins by initializing the depth index k to 0. At step 158, the method computes the kth depth by the linear relation $z=k*\Delta z+z_{min}$. At steps 160 and 162, the method downward continues the source wave field S and the receiver wave field R to the next depth. For wave-equation migration, the method can execute the downward continuation by a factorization of the acoustic wave equation into a one-way wave equation, which propagates waves only down (or up) in depth as described in Claerbout, *Toward a unified theory of reflector mapping*, Geophysics v. 36, p. 467 (1971), which is incorporated by reference. This allows recursive propagation of energy from the surface (z=0) into the sub-surface (z>0).

Biondi, *3D Seismic Imaging* (2006), which is incorporated by reference, gives an overview of the implementations of the one-way wave equation. In an embodiment, the Phase Shift Plus Interpolation method described in Gazdag and Sguazzero, *Migration of seismic data by phase-shift plus interpolation*, Geophysics, v. 49, p. 124 (1984), which is incorporated by reference, is used to implement the one-way wave equation.

The method of FIG. 6 will populate the appropriate row of all time-shift gathers (See FIG. 4) at each depth by applying the time-shift imaging condition (See FIG. 7) to the source wave field S and the receiver wave field R at step 164. After application of the time-shift imaging condition, the method increments the depth index at step 166. If the maximum depth $z_{max}$ was exceeded at step 168, the method proceeds to the next shot gather. If not, the method returns to process the next depth at step 158. The method increments the shot gather index at step 170. If the final shot has been migrated, then at step 172, the method continues to the next frequency. Otherwise, the method returns to process the next shot gather at step 146. The method increments the frequency index at step 174. If the maximum frequency, $\omega_{max}$ has been migrated, then at step 176, the method exits to write a file containing the time-shift gathers and the amplitude-squared time shift gathers at step 178. If not, the method returns to process the next frequency at step 142.

Figure 7:
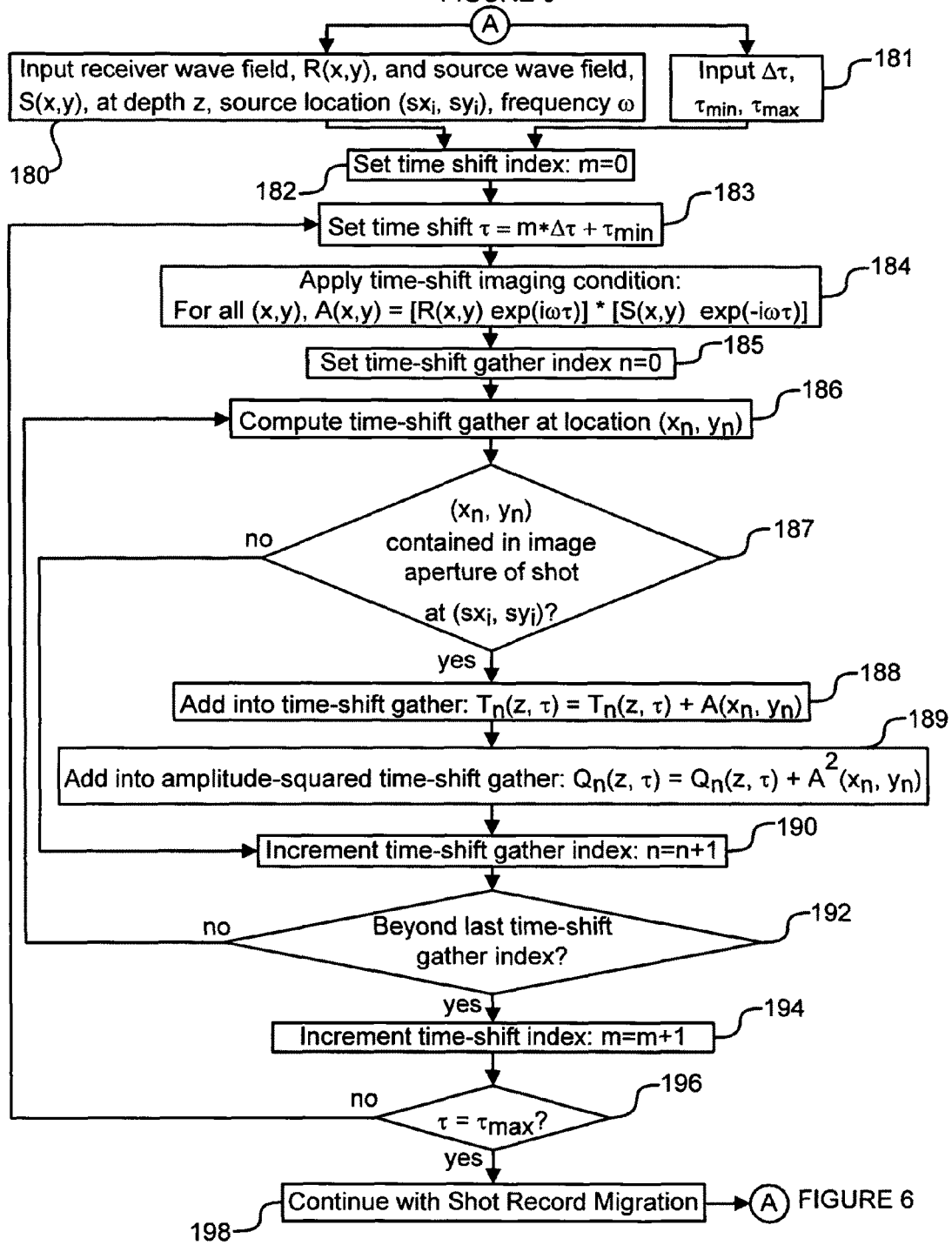
FIG. 7 illustrates a method of construction of a time-shift gather.

FIG. 7 illustrates computation of a collection of time-shift gathers for a single frequency, $\omega$, a single shot gather located at $(sx_i, sy_i)$, and a single depth, z. The method time shifts the source wave field S and receiver wave field R from the shot record migration and correlates them for an ensemble of time shifts. For each time shift, the method extracts the time shifted trace at each time shift location within the current shot image aperture. The method enters at step 164 from the method of FIG. 6. At step 180, the method inputs the source wave field S and the receiver wave field R. As in FIG. 4, the method applies the time-shift imaging condition for a plurality of time shifts. At step 181, the method inputs the axis parameters for the time shift variable $\tau$. It is simplest to parameterize each time shift in terms of the minimum time shift $\tau_{min}$, the spacing between adjacent time shifts $\Delta\tau$, and the maximum time shift $\tau_{max}$. In an alternative embodiment, the method can use irregularly-spaced time shifts. At step 182, the method initializes the time-shift index m to 0. At step 183, the method computes the current time shift $\tau$ by the linear relation $\tau=m*\Delta\tau+\tau_{min}$. At step 184, the method applies the time shift in the frequency domain via multiplication with the complex exponential $\exp(-i\omega\tau)$ to the down-going source wave field S and similarly applies time shift $\exp(i\omega\tau)$ to the up-going receiver wave field R. The method then multiplies the time shifted receiver wave field with the complex conjugate of the time shifted source wave field point-wise at each (x, y) location. The method stores the result in a temporary array A. At step 185, the method initializes the time-shift gather location index n to 0. At step 186, the method reads the current time-shift gather location $(x_n, y_n)$. The user inputs a list of time-shift gather locations and shot image aperture dimensions at run-time. At step 187, if $(x_n, y_n)$ lies inside the current shot image aperture (See FIG. 5), the method adds the local value of the temporary array A at $(x_n, y_n)$ in the appropriate row of the time-shift gather at step 188, and adds the square of the local value of the temporary array A at $(x_n, y_n)$ in the appropriate row of the amplitude-squared time-shift gather at step 189. At step 190, the method increments the time-shift gather index. If $(x_n, y_n)$ does not lie inside the current shot image aperture, the method proceeds to step 190 without executing steps 188 and 189. If, at step 192, the method determines that the time-shift gather index exceeds the last time-shift gather index, the method proceeds to the next time shift value. Otherwise, the method returns to step 186 to process the next time-shift gather. At step 194, the method increments the time-shift index. If the method determines that the current time shift $\tau$ exceeds the maximum time-shift index $\tau_{max}$ at step 196 the method continues to step 198 at which point it returns at step 166 to the shot record migration in FIG. 6. If not, the method returns to step 183 to process the next time-shift value.

From FIG. 4, it can be seen that on a time-shift gather, the image is best focused at some $\tau_f$, which may or may not be equal to zero. In an embodiment, the invention relates $\tau_f$ to a change in velocity. Adding this change in velocity to the migration velocity better approximates the propagation velocity which will produce more accurate images of the earth's geology. To make the focusing information on a time-shift gather more readily understood, the method converts the time-shift gathers and amplitude-squared time-shift gathers to semblance gathers.

Figure 8A:
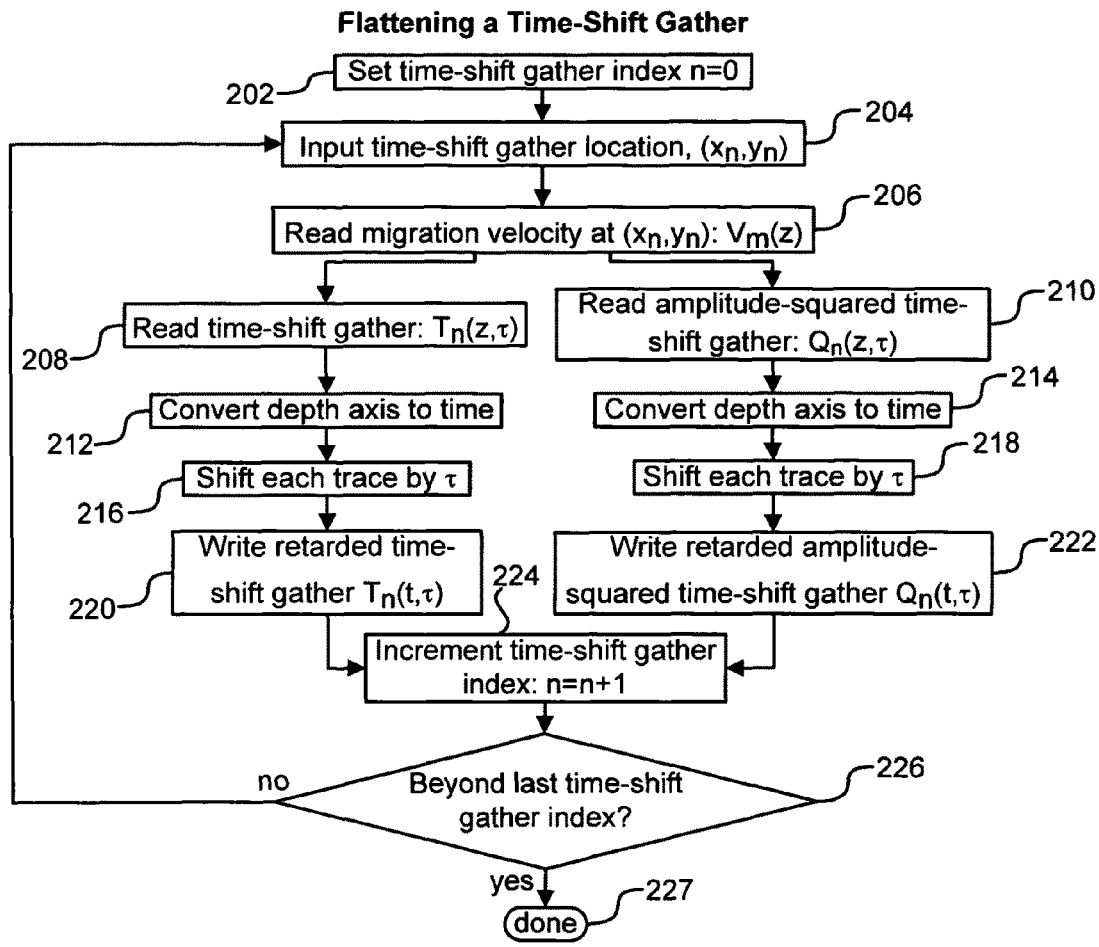
FIGS. 8A-8C illustrate a method of flattening or retardation of a time-shift gather.
Figures 8B, 8C:
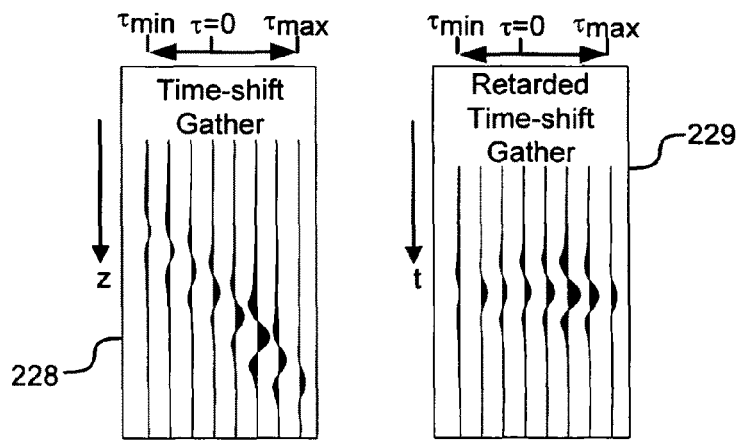

FIGS. 8A-8C illustrate an optional and intermediate step in computing semblance gathers, referred to as "retardation" or flattening. After retardation, the slanting reflection events on a time-shift gather and amplitude-squared time-shift gather are approximately flat as a function of time shift τ.

In FIG. 8A at step 202, the method initializes the time-shift gather index n to 0. At step 204, the method reads the current time-shift gather location $(x_n, y_n)$ from the trace header of a time-shift gather file. At step 206, the method reads a single trace, $V_m(z)$, from the migration velocity cube at location $(x_n, y_n)$. At step 208, the method reads the current time-shift gather. At step 210, the method reads the current amplitude-squared time-shift gather. Using the migration velocity, the method converts the depth axis of the current time-shift gather and amplitude-squared time-shift gather to time at steps 212 and 214, respectively. For each trace in the current time-shift gather, the method applies a vertical shift of magnitude τ at step 216. The method also applies a vertical shift of magnitude τ to the current amplitude-squared time-shift gather at step 218. To a first order, the method flattens each event on the time-shift gather with respect to τ about τ=0. At step 220, the current retarded time-shift gather is written. At step 222, the current retarded amplitude-squared time-shift gather is written. At step 224 the time-shift gather index n is incremented. If, at step 226, the time-shift gather index exceeds the number of time-shift gathers, then the method exits at step 227. If not, the method returns to step 204 to read the next time-shift gather.

FIGS. 8B and 8C illustrate the flattening or retardation step. FIG. 8B shows a time-shift gather 228 computed when the migration velocity was faster than the propagation velocity (same as in FIG. 4). FIG. 8C shows the result of converting the depth, z, axis of time-shift gather 228 to time, t, and flattening of the slanting seismic event about τ=0, to form retarded time-shift gather 229.

Figure 9:
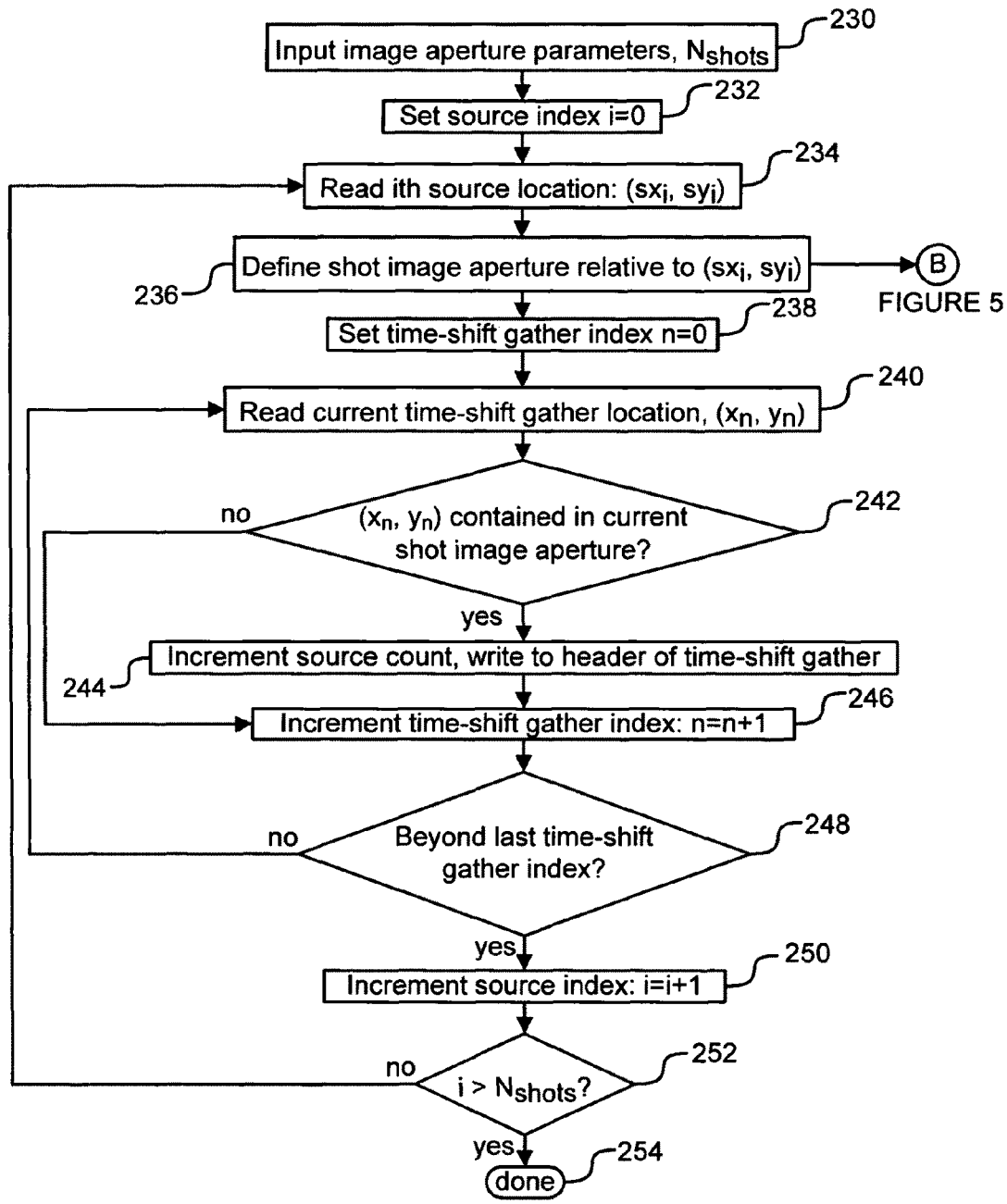
FIG. 9 illustrates counting the shots contributing to a time-shift gather.

The number of shot record images that contribute to a time-shift gather location can be used to compute the semblance as shown in FIG. 9. As shown in FIG. 5, each shot gather image has a finite aperture which may not contain every time-shift gather location. At step 230, the method inputs the total number of shot gathers, $N_{shots}$, and parameters describing the size of the shot image aperture. At step 232, the method initializes the source index i to 0. At step 234, the method reads the ith source location $(sx_i, sy_i)$ from the trace header of any trace in the current shot gather. At step 236, the method defines the shot image aperture. At step 238, the method initializes the time-shift gather index n. At step 240, the method reads the nth time-shift gather location $(x_n, y_n)$ from the trace header of any trace in the current time-shift gather. At step 242, the method arrives at a decision block: if $(x_n, y_n)$ is inside the shot image aperture corresponding to the source location $(sx_i, sy_i)$, then the method increments the count of sources contributing to the current time-shift gather and writes that count in the trace header of the time-shift gather file at step 244. If $(x_n, y_n)$ is not inside the image aperture, then the method skips step 244 and increments the time-shift gather index at step 246. If the time-shift gather index is beyond the maximum time-shift gather index, then at step 248, the method processes the next shot gather at step 250. If not, the method processes the next time-shift gather at step 240. The method next increments the shot gather index at step 250. If, at step 252, the shot gather index is beyond the maximum number of shot gathers $N_{shots}$, the method terminates at step 254. If not, the method returns to step 234 to process the next shot gather.

Figure 10:
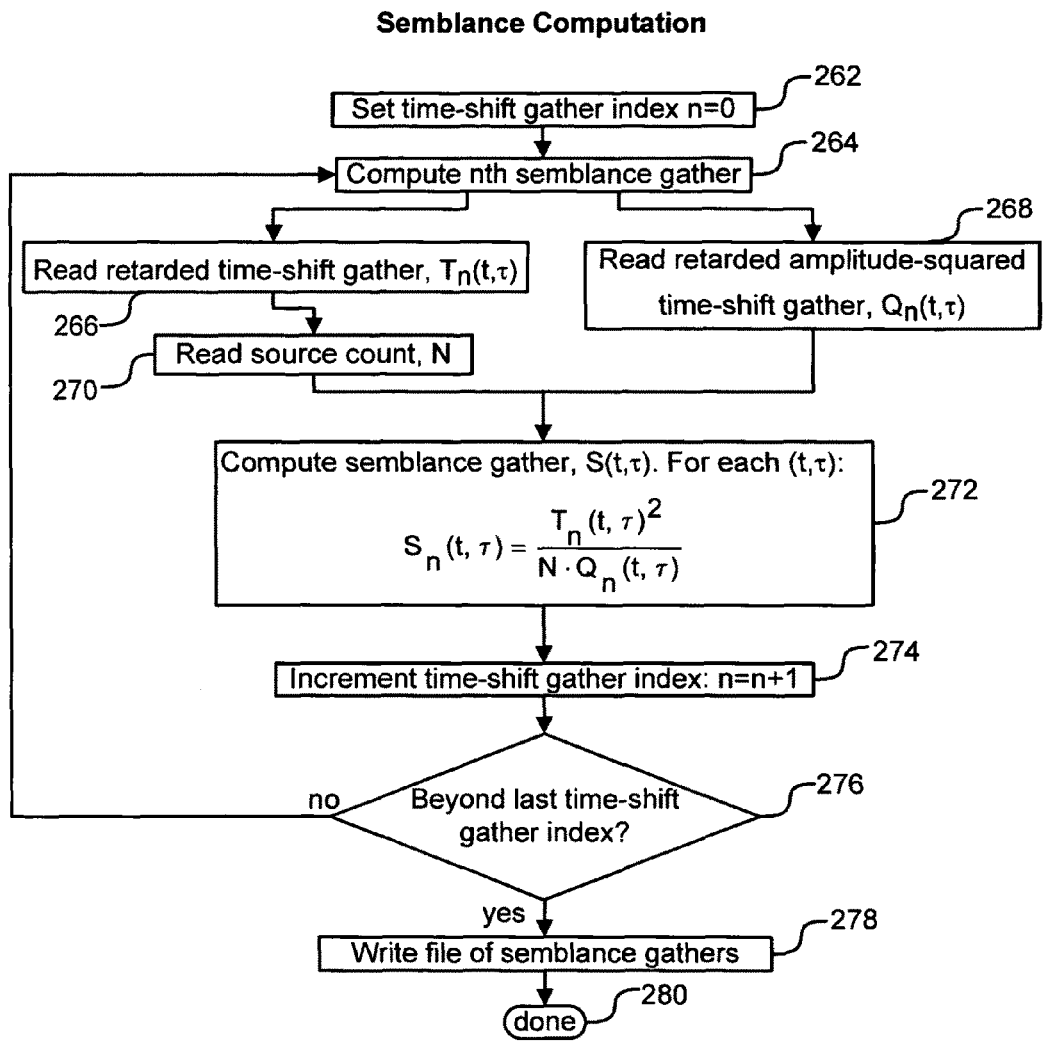
FIG. 10 illustrates a method of semblance computation.

The semblance computation is illustrated in FIG. 10. At step 262, the method initializes the time-shift gather index n to 0. At step 264, the method begins to process the nth semblance gather. At steps 266 and 268, respectively, the method reads the current retarded time shift gather and retarded amplitude-squared time-shift gather and stores the two-dimensional arrays, $T_n$ and $Q_n$. At step 270, the method reads the number, N, of shot gather images contributing to the current time-shift gather (See FIG. 9) from the trace header. At step 272, the method computes the semblance gather using the current time-shift gather, the amplitude-squared time-shift gather, and the source count. Each sample of the two-dimensional semblance gather, $S_n(t, \tau)$ is filled according to the following relation:

$$S_n(t, \tau) = \frac{T_n(t, \tau)^2}{N \cdot Q_n(t, \tau)}, \quad (1)$$

where $T_n(t, \tau)$ corresponds to a sample from the current retarded time-shift gather and $Q_n(t, \tau)$ corresponds to a sample from the current retarded amplitude-squared time-shift gather. The computed semblance gather $S_n$ is everywhere positive with a maximum at the point of best focusing, $(t_f, \tau_f)$.

Figure 12A:
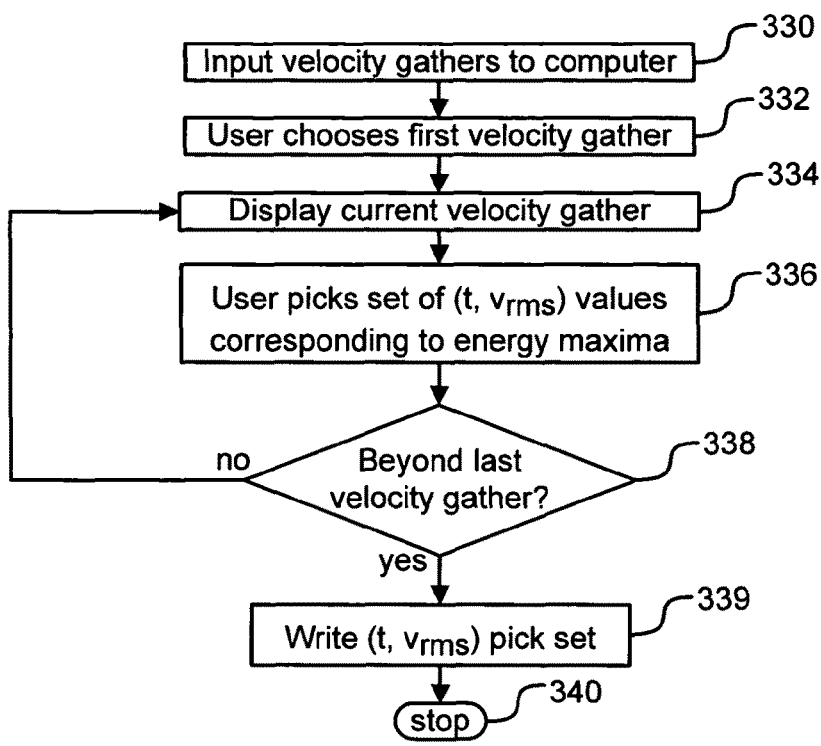
FIGS. 12A-12D illustrate selecting by user input energy peaks on velocity gathers.
Figures 12B, 12C, 12D:
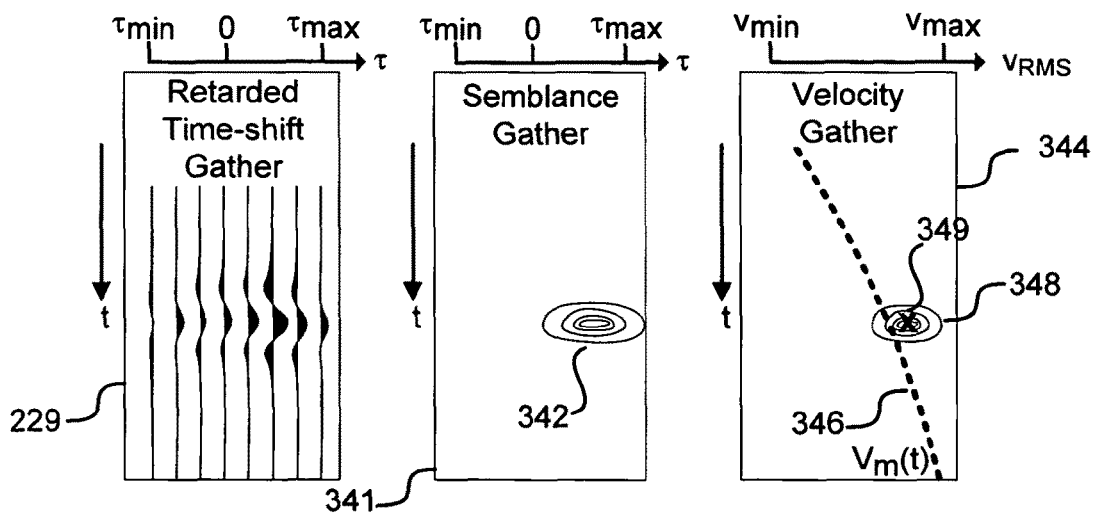

A semblance gather 341 is shown in FIG. 12C. The energy peak 342 has a maximum at the same $(t, \tau)$ as the corresponding retarded time-shift gather 229 as shown in FIG. 8C.

At step 274 in FIG. 10, the method increments the time-shift gather index. If, at step 276, the time-shift gather index is greater than the total number of time-shift gathers, the method writes a file of semblance gathers at step 278. If not, the method computes the next semblance gather at step 264. The method exits at step 280.

The semblance computation of equation (1) represents only one embodiment for facilitating the interpretation of energy peaks on the time-shift gathers. In alternative embodiments, other forms of semblance may be computed. For example, MacKay and Abma, *Imaging and velocity estimation with depth-focusing analysis*, Geophysics, v. 57, p. 1608 (1992), which is incorporated by reference, describe using the envelope function, which may be used in our invention to compute other forms of coherence rather than semblance. The method can utilize the energy peaks directly on time-shift gathers without using any coherence calculation. Additionally, the method can compute the semblance in depth first then convert to time and apply the retardation to the semblance. The order in which this is done is not essential to the invention. It is also possible for the method to perform the optional retardation step after applying a semblance measure.

In an embodiment, the invention transforms a time-shift parameter, τ to a change in velocity. The physical basis of this transformation is the relation of the time shift parameter as shown in FIG. 3B. Δt is the amount of time separating the energy peaks on a downward continued data trace and downward continued simulated source trace at depth $z_r$. Δt represents the travel time of a reflection event from source position $s_r$ to the focusing depth $z_f$ and back to the receiver position $g_r$. When the migration velocity is correct, Δt is zero and the change in velocity will be zero.

Levin, *Apparent velocity from dipping interface reflections*, Geophysics 36, p. 510 (1971), which is incorporated by reference herein, gives an equation ("Levin's equation") that expresses the travel time of a seismic event from a dipping reflector in terms of the "zero-offset travel time" $t_0$, velocity c, dip angle θ, and "half offset" h:

$$c^2 t^2 = c^2 t_0^2 + 4h^2 \cos^2\theta. \quad (2)$$

An embodiment of the invention uses Levin's equation (2) as a starting point in the derivation of equations (14), (17), and (18), which are used to implement the method. That derivation follows below.

The present invention understands that in the course of shot record migration the shot gather and the simulated source trace are both downward continued to some depth Z using the migration velocity. In an embodiment, the method interprets the time t as the travel time through a "replacement overburden" having a velocity with characteristics that allow use of Levin's equation from earth's surface down to depth Z. The method relates depth Z to $t_0$ exactly for the constant velocity case even for dipping events. When the velocity is represented as a RMS velocity then the relation of Z to $t_0$ is exact for flat events and approximate for dipping events. Since the half offset h, the zero offset time $t_0$, and even the exact velocity, are not easily available during shot record downward continuation, the method eliminates these variables from equation (2) in favor of known quantities such as the migration velocity and travel time t.

Define Z as the vertical depth to the reflection point when h=0. Then Levin's equation (2) can be rewritten in terms of Z:

$$c^2 t^2 = \frac{4Z^2}{\cos^2\theta} + 4h^2 \cos^2\theta. \tag{3}$$

The method holds t, θ, and h constant and perturbs the velocity in equation (3), leading to a perturbed depth. The method defines the perturbed velocity v(t) and the perturbed depth Z' and rewrite equation (3):

$$v(t)^2 t^2 = \frac{4Z'^2}{\cos^2\theta} + 4h^2 \cos^2\theta. \tag{4}$$

The method subtracts equation (3) from (4) to derive a relationship between a perturbation in velocity Δv(t) and a perturbation in depth Δz:

$$\Delta v(t) = \frac{\bar{Z}}{\bar{v}} \frac{4\Delta z}{t^2 \cos^2\theta}, \tag{5}$$

$$\Delta v(t) \equiv v(t) - c; \Delta Z \equiv Z' - Z; \frac{\bar{Z}}{\bar{v}} = \frac{Z + \Delta Z/2}{c + \Delta v(t)/2}. \tag{6}$$

The method evaluates equation (3) at h=0, then relates ΔZ to a perturbation in zero offset travel time, $\Delta t_0$:

$$\Delta Z = \Delta t_0 \frac{c}{2} \cos\theta. \tag{7}$$

The method also manipulates equation (2) to relate perturbations in zero offset travel time $\Delta t_0$, to perturbations in non-zero offset travel time Δt. The method perturbs $t_0$ and t and algebraically rearranges equation (2) to obtain:

$$2t\Delta t\left(1 + \frac{\Delta t}{2t}\right) = 2t_0 \Delta t_0\left(1 + \frac{\Delta t_0}{2t_0}\right). \tag{8}$$

Starting with equation (4), the method inserts the relation for average depth-to-velocity ratio from equation (6) and then uses equation (7) to replace the ΔZ terms with $\Delta t_0$ terms to obtain:

$$\Delta v(t) = \frac{c t_0 \Delta t_0}{t^2}\left(1 + \frac{\Delta t_0}{2 t_0}\right)\left(1 + \frac{\Delta v(t)}{2c}\right)^{-1}. \tag{9}$$

The method recognizes a term that looks like the right-hand side of equation (8) in equation (9), and eliminates $t_0$ from equation (9) to obtain:

$$\Delta v(t) = \frac{c \Delta t}{t}\left(1 + \frac{\Delta t}{2t}\right)\left(1 + \frac{\Delta v(t)}{2c}\right)^{-1}. \tag{10}$$

The method further algebraically manipulates the last component of equation (10) to obtain:

$$\left(1 + \frac{\Delta v(t)}{2c}\right)^{-1} = \left(1 - \frac{\Delta v(t)}{v(t)}\right)\left(1 - \frac{\Delta v(t)}{2v(t)}\right)^{-1}. \tag{11}$$

The method also uses the fact that:

$$c = v(t)\left(1 - \frac{\Delta v(t)}{v(t)}\right). \tag{12}$$

The method uses relations (11) and (12), plus algebraic manipulations to modify equation (10) into the following relationship between Δt and change in RMS velocity, Δv(t):

$$\frac{\Delta t}{t} = -1 + \sqrt{1 + \frac{2\frac{\Delta v(t)}{v(t)}\left(1 - \frac{\Delta v(t)}{2v(t)}\right)}{\left(1 - \frac{\Delta v(t)}{v(t)}\right)^2}}, \tag{13}$$

Finally, the method associates Δt in equation (13) with the migration time shift parameter τ to obtain a relationship between Δv(t) and τ:

$$\frac{\tau}{t} = -1 + \sqrt{1 + \frac{2\frac{\Delta v(t)}{v(t)}\left(1 - \frac{\Delta v(t)}{2v(t)}\right)}{\left(1 - \frac{\Delta v(t)}{v(t)}\right)^2}}, \tag{14}$$

A feature of the invention is the independence of equation (14) from reflector dip and offset. Further, equation (14) is exact in the case of constant velocity and arbitrary reflector dip, and also exact in the case of depth variable velocity and flat reflectors.

The method simplifies equation (14) by defining relative velocity and time shifts α and β:

$$\alpha \equiv \frac{\Delta v(t)}{v(t)}; \beta \equiv \frac{\tau}{t}. \tag{15}$$

The method uses relations (15) to recast equation (14) as a quadratic equation in α and β. After common algebraic rearrangements of equation (15), the method obtains:

$$\frac{\beta^2}{2} + \beta - \frac{\alpha\left(1 - \frac{\alpha}{2}\right)}{(1-\alpha)^2} = 0. \quad (16)$$

The method solves quadratic equation (16), expands the square root to three terms, and keeps only terms of order $\alpha^2$, to obtain an approximation to equation (14):

$$\frac{\tau}{t} = \frac{\Delta v(t)}{v(t)}\left(1 + \frac{\Delta v(t)}{v(t)}\right). \quad (17)$$

Equation (17) is quite accurate. For a relative velocity perturbation of 10% (α=0.1), the correct result is β= 0.1111 . . . , while equation (17) yields a result of β=0.11, implying an error of only 0.1%.

Another, less accurate, approximation to equation (14) is applicable when $\Delta v(t)/v(t) \ll 1$:

$$\frac{\Delta v(t)}{v(t)} \approx \frac{\tau}{t}. \quad (18)$$

The analysis above can be repeated for depth-variable velocity. The method assumes that the reflector depth is controlled by the average velocity and repeats the analysis above, yielding a result similar to equations (14), (17), and (18), except that v(t) is replaced with RMS velocity.

Figure 11:
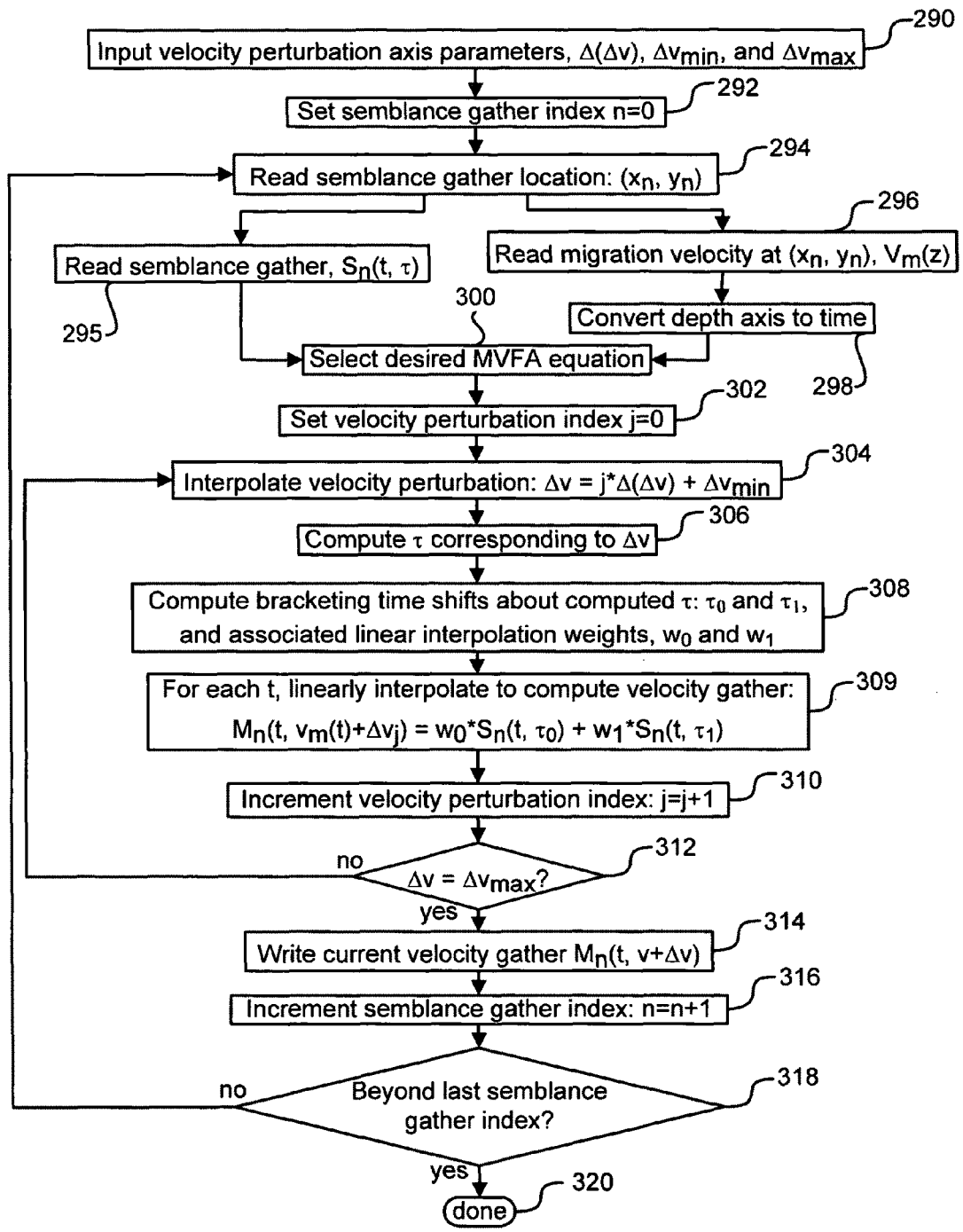
FIG. 11 illustrates a method of wave equation migration velocity focusing analysis.

The computer implemented methods of equations (14), (17), and (18) are shown in FIG. 11. At step 290, the method inputs the axis parameters for the Δv axis: the minimum value, $\Delta v_{min}$, the increment between adjacent samples, Δ(Δv), and the maximum value, $\Delta v_{max}$. At step 292, the method initializes the semblance gather index n. At step 294, the method reads the nth semblance gather location, ($x_n$, $y_n$) from the trace header of any trace in the semblance gather. At step 295, the method reads the current semblance gather into a two-dimensional array, $S_n$(t, τ). At step 296, the method reads the trace of the migration velocity at ($x_n$, $y_n$) into a one dimensional array. At step 298, the method converts the depth axis of the velocity to time. At step 300, the method permits the user to select one of the migration velocity focusing analysis (MVFA) equations, that is equation (14), (17), or (18). The MVFA transformation represents a time-dependent stretch of the τ axis of a semblance gather to Δv.

The method loops over the output domain Δv. At step 302, the method initializes the velocity perturbation index j to 0. At step 304, the method computes the current Δv by the linear equation Δv=j*Δ(Δv)+$\Delta v_{min}$. At step 306, the selected MVFA equation computes the value of τ corresponding to the current value of Δv. At step 308, the method computes the two grid points, $\tau_0$ and $\tau_1$, on the τ-axis bracketing the value of τ. The method computes the linear interpolation weights, $w_0$ and $w_1$ according to the relations $w_0=(\tau_1-\tau)/\Delta\tau$ and $w_1=1-w_0$, where Δτ is the distance between adjacent τ grid points on $S_n$(t, τ). For each time t the method averages the values of the semblance gather at the two bracketing grid points to produce one sample of the velocity gather $M_n$(t, $v_m$(t)+Δv) at step 309. Although the MVFA mapping of equations (14), (17), or (18) is between τ and Δv, in the mapping shown at step 309, τ is mapped to v+Δv. The method may also define the velocity gather only in terms of Δv. At step 310, the method increments the velocity perturbation index. If, at step 312, the current Δv value is equal to $\Delta v_{max}$, the method proceeds to step 314. If not, the method returns to process the next velocity perturbation at step 304. At step 314, the method writes the recently computed velocity gather. At step 316, the method increments the semblance gather index. If the semblance gather index is beyond the last semblance gather index at step 318, the method terminates at step 320. If not, method returns to step 294 to compute the next velocity gather.

After the method converts a semblance gather to a velocity gather as described by FIG. 11, the method maps a given energy peak on the semblance gather, ($t_f$, $\tau_f$) to an energy peak on the velocity gather ($t_f$, $v_{rms}+\Delta v_{rms}$). FIG. 12C shows an energy peak 342 on a semblance gather 341. The method maps that energy peak to a corresponding energy peak 348 on the velocity gather 344 as shown in FIG. 12D. The migration velocity 346, $V_m$(t) is plotted as a thick dotted line. If, as in FIG. 12D, the migration velocity is too slow, the energy peak on the velocity gather 344 indicates that a higher velocity is needed to approximate the propagation velocity. The method defines the output velocity gather in terms of total updated velocity ($v_{rms}+\Delta v_{rms}$). The method may also define the velocity gather in terms of velocity change $\Delta v_{rms}$ alone.

Figure 13:
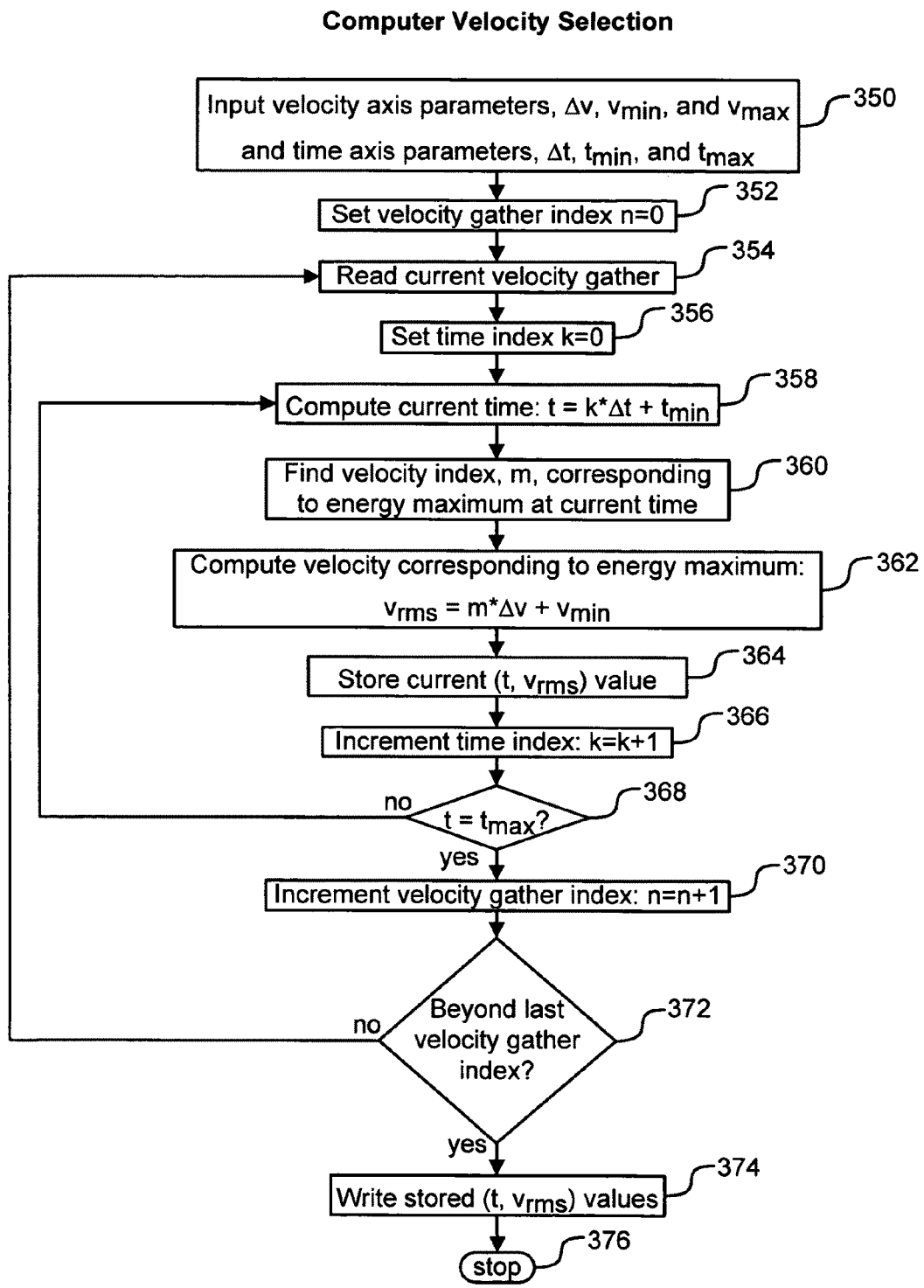
FIG. 13 illustrates automatically selecting of energy peaks on velocity gathers.
Figure 14:
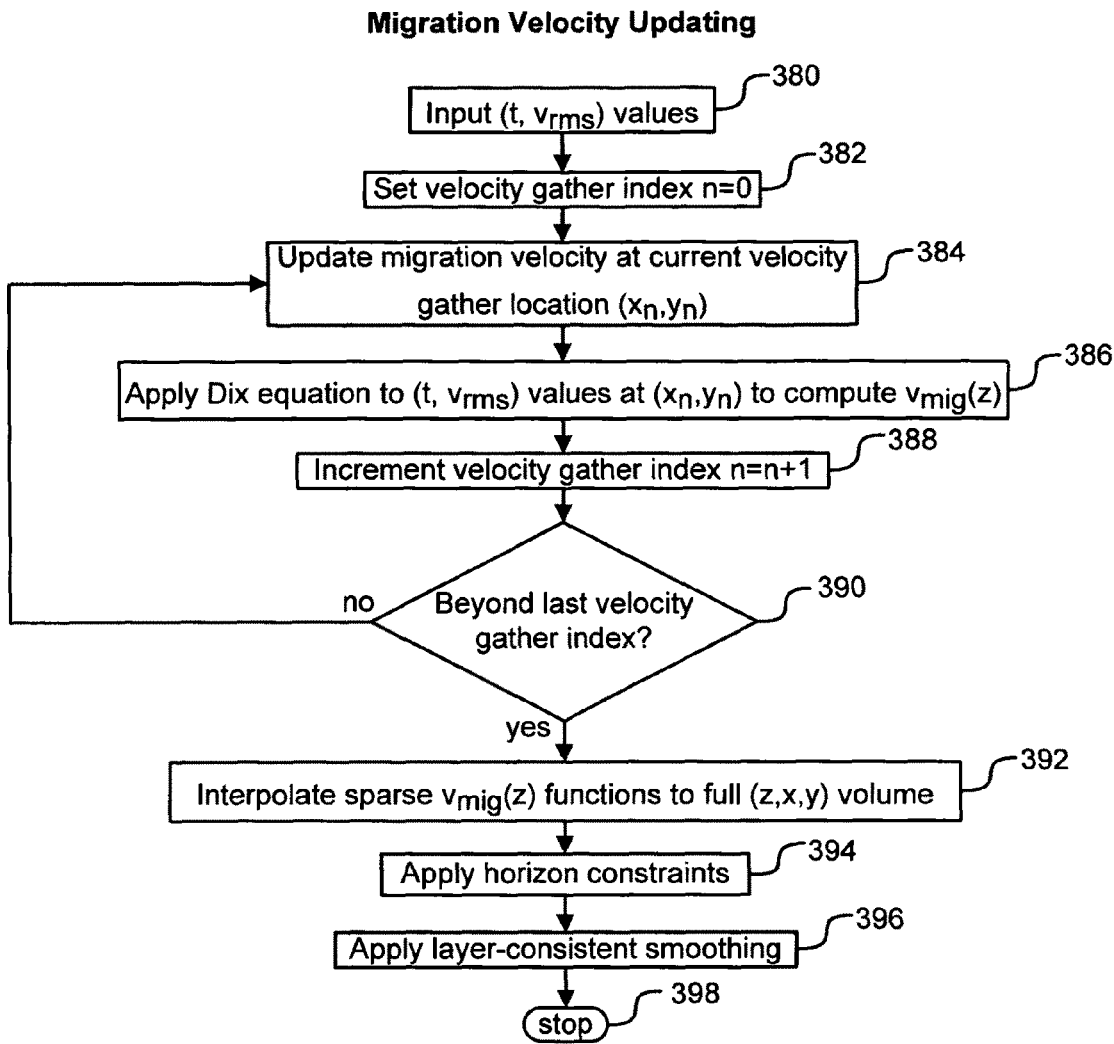
FIG. 14 illustrates a method of updating the migration velocity.

FIGS. 12-14 illustrate a method to update the migration velocity to approximate the true propagation velocity. FIG. 12A illustrates that the host can display the results to human who can visually pick the energy peaks of the velocity gathers. At step 330, the velocity gather file is input to an application which allows a user to view a velocity gather, pick individual points in (t, $v_{rms}$) space and save the points to a file. Many suitable software applications exist such as the GSEGYView viewer, which is available and can be downloaded from SourceForge at www.sourceforge.net. The user can loop over the desired velocity gathers as described earlier. Starting with the first velocity gather at step 332, the method displays the current velocity gather at step 334. At step 336, the user selects energy maxima on the current velocity gather that correspond to the subsurface reflection events. If the user has reached the last velocity gather at step 338, then at step 339, the user's selection of (t, $v_{rms}$) is written to a file and the method terminates at step 340.

FIGS. 12B, 12C, and 12D illustrate the processing sequence from retardation of time-shift gathers to semblance gathers to picking velocities on velocity gathers. The retarded time-shift gather 229 shown in FIG. 12B is the same as retarded time-shift gather 229 shown in FIG. 8C. The energy peak 342 on the corresponding semblance gather 341 is shown in FIG. 12C. FIG. 12D shows how energy peak 342 on FIG. 12C is mapped to an energy peak 348 on the velocity gather 344. The migration velocity 346, $V_m$(t), is plotted as a thick dotted line. If the migration velocity is too slow, the energy peak 348 on the velocity gather 344 indicates that a velocity speedup is needed to better approximate the true propagation velocity. The bold "x" symbol 349 represents a single (t, $v_{rms}$) selection that can be made by a human interpreter as described in FIG. 12A or by a computer as described below in FIG. 13. The collection of all (t, $v_{rms}$) picks on all velocity gathers can be used to update the migration velocity.

FIG. 13 illustrates a computer implemented method that selects the energy peaks on velocity gathers. At step 350, the method inputs the axis parameters for the velocity axis: the minimum value $v_{min}$, the increment between adjacent samples Δv, and the maximum value $v_{max}$. The velocity gather's horizontal axis is parameterized in terms of velocity and not the velocity perturbation. Also at step 350, the method inputs the axis parameters for the time axis, the minimum value $t_{min}$, the increment between adjacent samples $\Delta t$, and the maximum value $t_{max}$. At step 352, the method initializes the velocity gather index n to 0. At step 354, the method reads the current velocity gather into a two-dimensional array, the axes of which are time and velocity. At step 356, the method initializes the time index k to 0. At step 358, the method computes the current time t by the linear equation $t=k*\Delta t+\tau_{min}$. At step 360, the method computes the velocity index m, corresponding to the maximum value of the row of the velocity gather at the current time index. At step 362, the method computes the RMS velocity, $v_{rms}$, corresponding to the velocity index m by the linear equation $v_{rms}=m*\Delta v+v_{min}$. At step 364, the method stores the current (t, $v_{rms}$) value corresponding to the current energy peak. At step 366, the method increments the time index. If the time corresponding to the incremented time index exceeds $t_{max}$ at step 368; the method proceeds to step 370. If not, the method returns to step 358 to process the next time value. At step 370, the method increments the velocity gather index. If, at step 372, the velocity gather index exceeds the maximum velocity gather index, the method proceeds to step 374. If not, the method returns to step 354 to process the next velocity gather. At step 374, the method writes the stored collection of (t, $v_{rms}$) values. At step 376, the method exits.

FIG. 14 illustrates how the energy peaks selected by the methods of FIG. 12 or FIG. 13 can be used to update the migration velocity. At step 380, the method inputs the energy peaks from either FIG. 12 or FIG. 13. At step 382, the method initializes the velocity gather index n. At step 384, the method updates the migration velocity at the current velocity gather location. At step 386, the method uses the (t, $v_{rms}$) selected at the current velocity gather location to derive an interval velocity, $v_{mig}(t)$, as a function of depth by solving the Dix equation with feasibility constraints (i.e., greater than a realistic minimum velocity and less than a realistic maximum velocity) on the value of the velocity. The Dix equation is described in C. H. Dix, Seismic velocities from surface measurements, Geophysics, v. 20, p. 68 (1955), which is incorporated by reference herein. At step 388, the method increments the velocity gather index. If the method determines the last velocity gather index has been exceeded at step 390, the method proceeds to step 392. If not, the method returns to process the next velocity gather at step 384. After the velocity gather locations have been processed, the method interpolates the collection of sparsely sampled interval velocity functions, $v_{mig}(t)$, at step 392 to form a fully sampled volume of updated migration velocities. At step 394, the method applies constraints to enforce mathematical properties (i.e., continuity of the velocity and/or the first derivative) across the interpreted geologic interfaces. At step 396, the method applies polynomial smoothing to smooth the velocity within each geologic layer defined by the user. At step 398, the method exits. It should be noted that steps 386, 392, 394, and 396 may be accomplished using the SeisPak software system, described earlier.

Figure 15:
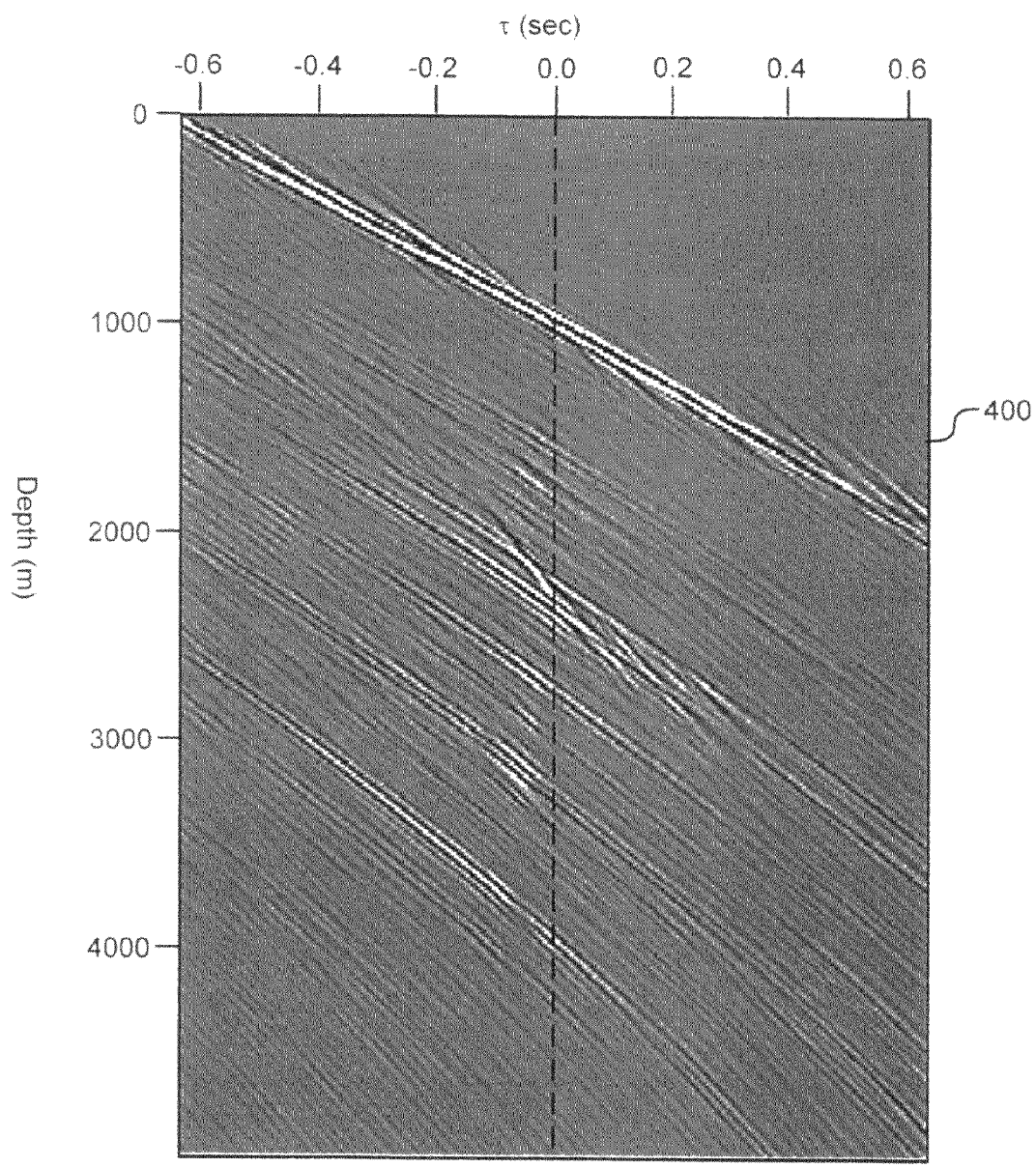
FIG. 15 illustrates a time-shift gather based on synthetic data.

As noted above, velocity analysis using the invention begins with time-shift gathers, computed with a wave equation shot record depth migration algorithm. FIG. 15 illustrates an actual time-shift gather 400 taken from a synthetic dataset migrated with an incorrect velocity. The velocity was correct above a depth of 2,500 m. For the deeper reflectors, the energy peaks are shifted away from r=0 by as much as −0.15 second.

FIGS. 16-18 illustrate application of the invention to a complex 2D synthetic dataset designed to mimic geologic structures such as those found in the Belridge Field, Calif., USA. The synthetic example includes 200 m of topographic relief, a weathering layer of variable thickness, significant lateral velocity variation, and dips to 75 degrees. Shot gathers were simulated over a 10 km profile, using a pseudo-spectral acoustic wave equation solver, with frequencies up to 45 Hz. Density contrasts produce most of the reflections. After building an initial velocity model, two iterations of the method were applied to test the efficacy of the method.

Figure 16A:
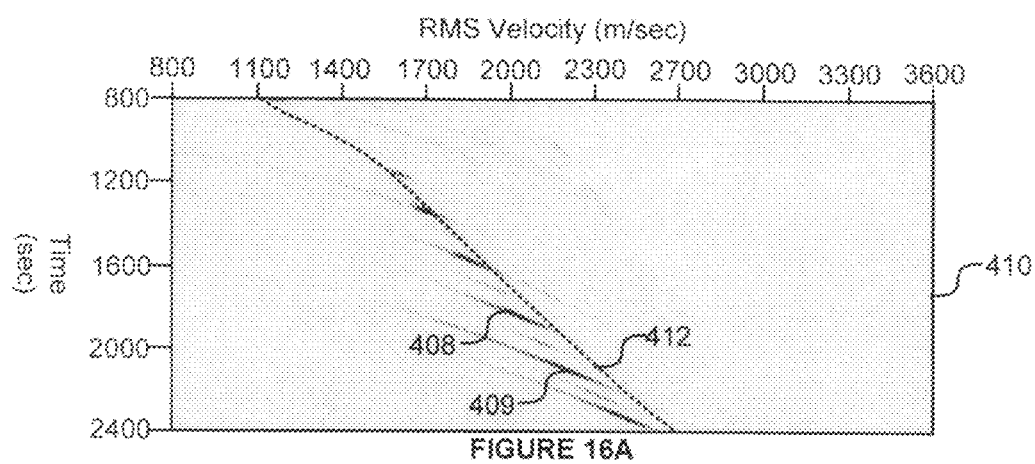
FIGS. 16A-16C illustrate velocity gathers with varying amounts of velocity error.
Figure 16B:
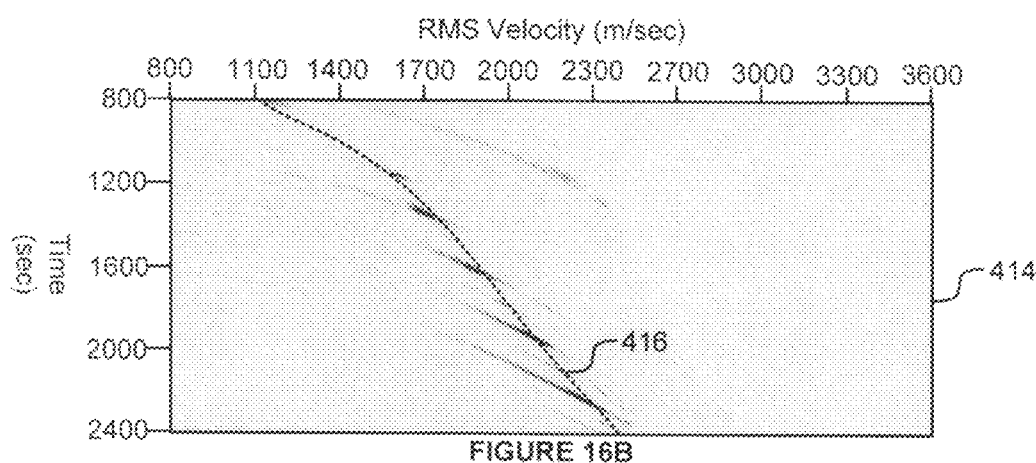
Figure 16C:
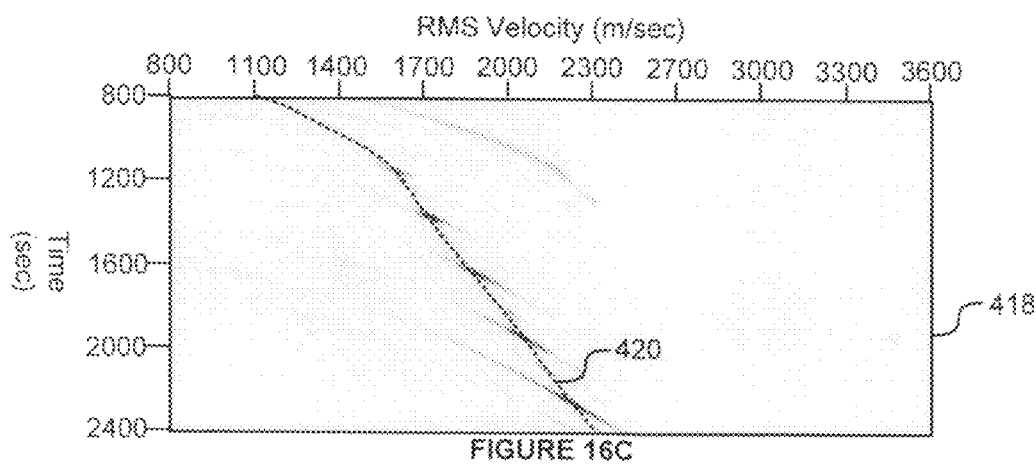

FIGS. 16A-16C show velocity gathers computed using the synthetic land dataset. The thick dotted lines show the RMS migration velocity as a function of time. In an embodiment, the method updates the migration velocity by picking the velocity peaks and converting to an interval velocity using Dix equation, as shown in FIG. 14. The dark semblance peaks represent the RMS velocity implied by the method. The velocity gather 410 shown in FIG. 16A was computed using the initial migration velocity 412. The semblance peaks do not overlay the migration velocity, implying that the migration velocity should be slowed down or sped up. The velocity gather 414 shown in FIG. 16B was computed using the migration velocity 416 estimated after two iterations of the method, and it can be seen that the semblance panels overlay the migration velocity more accurately than those shown in FIG. 16A, implying that the migration velocity is closer to the true propagation velocity. The velocity gather 418 shown in FIG. 16C was computed using the true propagation velocity 420. Comparing FIG. 16B to FIG. 16C, it is apparent that by applying two iterations of the method, the propagation velocity has been accurately estimated.

Figure 17A:
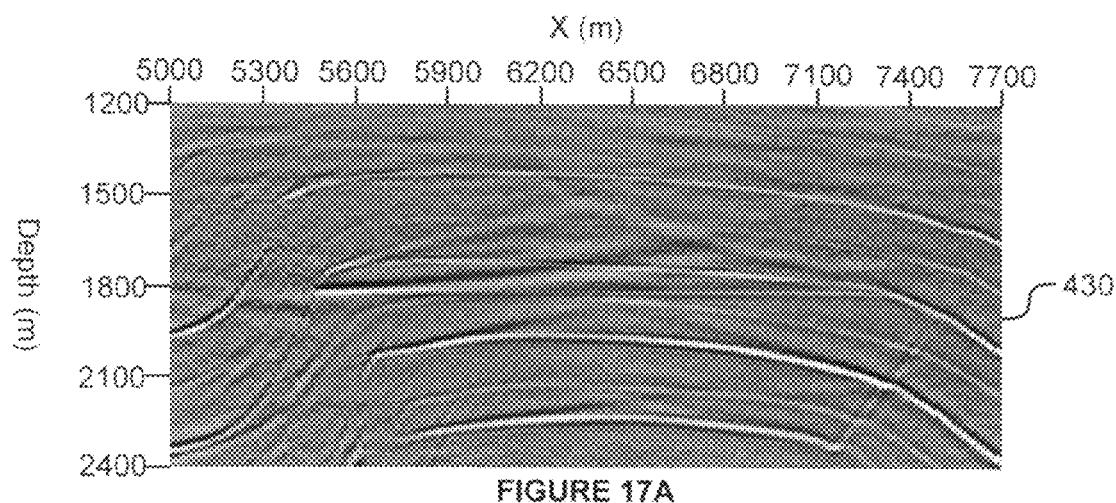
FIGS. 17A-17C illustrate migration results with varying velocity errors.
Figure 17B:
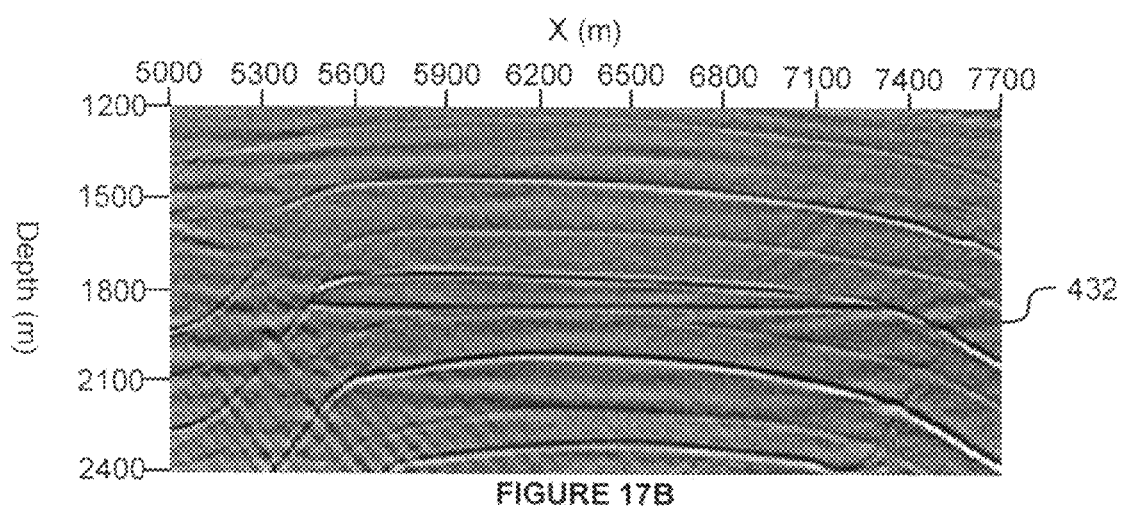
Figure 17C:
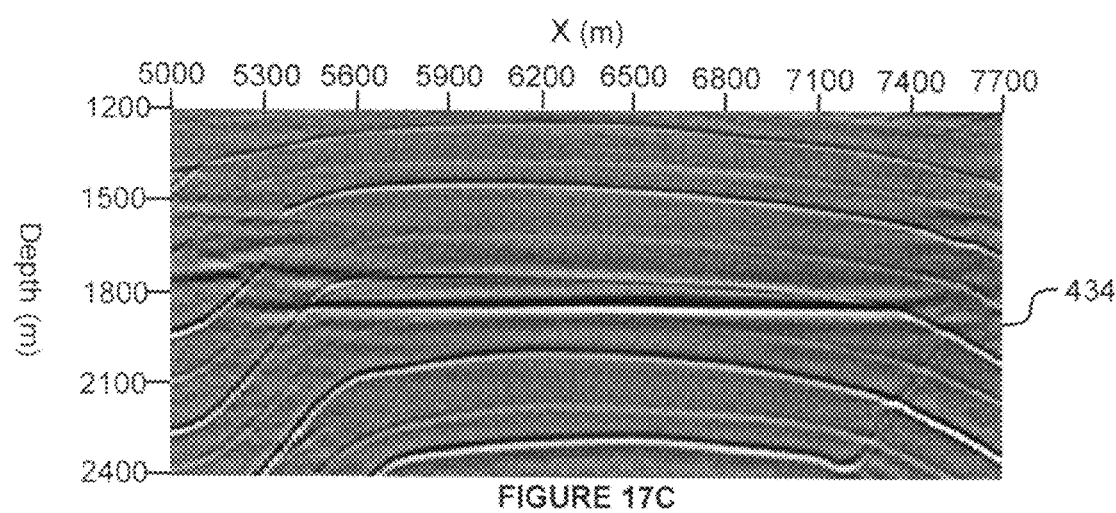

FIGS. 17A-17C show subsets of the shot record migration images corresponding to the initial migration velocity, the migration velocity after two iterations of the method, and the true propagation velocity. As shown in FIG. 17A, the image 430 obtained by migrating with the initial migration velocity has poor focusing of the steep dips on the left side of the anticline. As shown in FIG. 17B, after two iterations of the method, both the fault on the right side of the image 432 and the steep dips on the left side of the image are well-imaged, as are the steep dips. As shown in FIG. 17C, the image 434 obtained by migrating with the true propagation velocity matches the image 432 obtained by migrating with the velocity estimated by the method. Some depth errors remain, mostly due to shallow low velocity pods that were not fully inverted for as shown in FIG. 18. However, the focusing and positioning of most events in image 432 shown on FIG. 17B confirms that the velocity obtained by applying two iterations of the method accurately approximates the true propagation velocity.

Figure 18A:
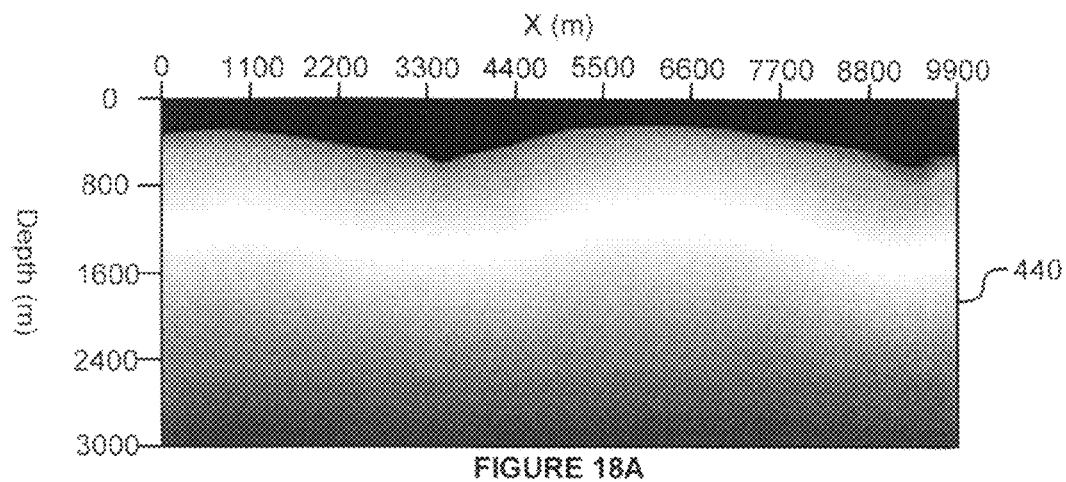
FIGS. 18A-18C illustrate a comparison of velocity models used in a feasibility test.
Figure 18B:
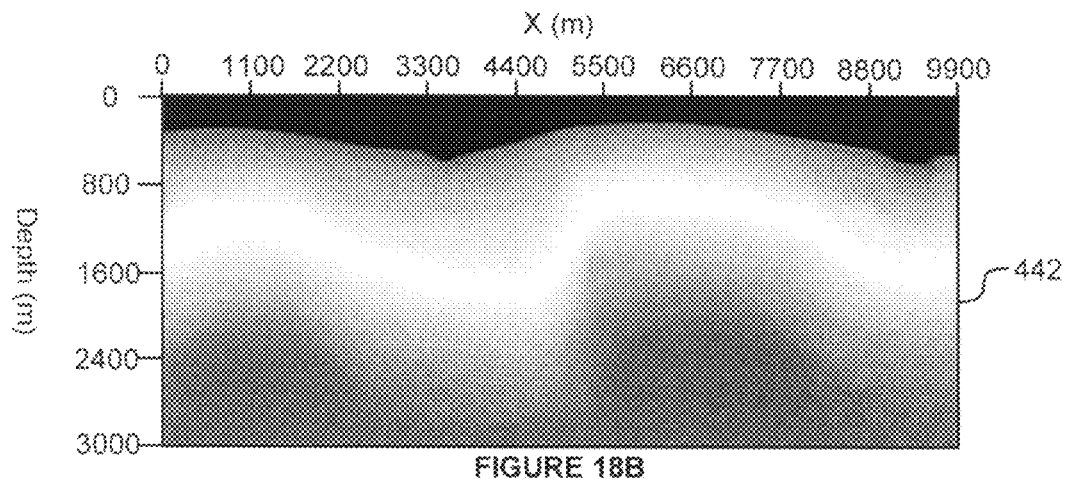
Figure 18C:
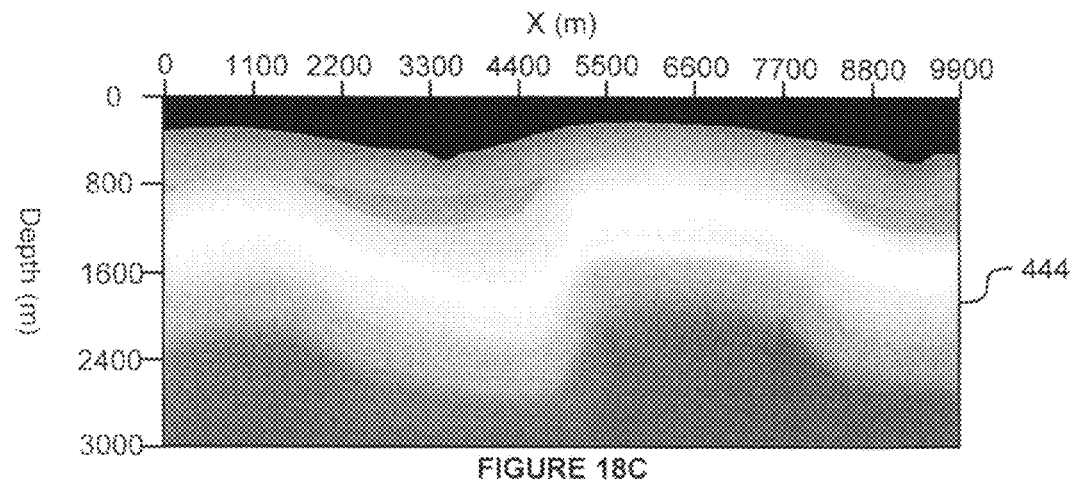

FIGS. 18A-18C show the initial migration velocity, the migration velocity after two iterations of the method, and the true propagation velocity. As shown in FIG. 18A, initial migration velocity 440 is simply a single v(z) function "hung" from the base of the weathering layer. As shown in FIG. 18B, after two iterations of the method, migration velocity 442 contains considerably more structure than the initial migration velocity. FIG. 18C shows the true propagation velocity 444. The estimated velocity 442 is smoother than the true velocity 444. Also, several low velocity "pods" were not reproduced by the method. This is related to the velocity inversion scheme and parameterization of the model, rather than limitation of the invention. When justified by prior information such as well logs or geologic constraints, discontinuous velocity models can be estimated. Still, comparing the migration velocity 442 to the initial velocity 440 and the true velocity 444, it is apparent that two iterations of the method have reconstructed the large velocity structures, which is a key element to achieve accurate event positioning after migration.

Our invention to compute the propagation velocity can be employed for seismic imaging. The invention outputs a volume (i.e., x-y-z values) of propagation velocity that can be input to an imaging method that takes in raw seismic data that has little resemblance to earth's geological layers and transforms this data into an image displayed on the host that contains clearly identifiable geological interfaces below the surface of the earth. The method also improves the fidelity of the reflection amplitude with respect to angle of incidence on the reflector.

Figure 19:
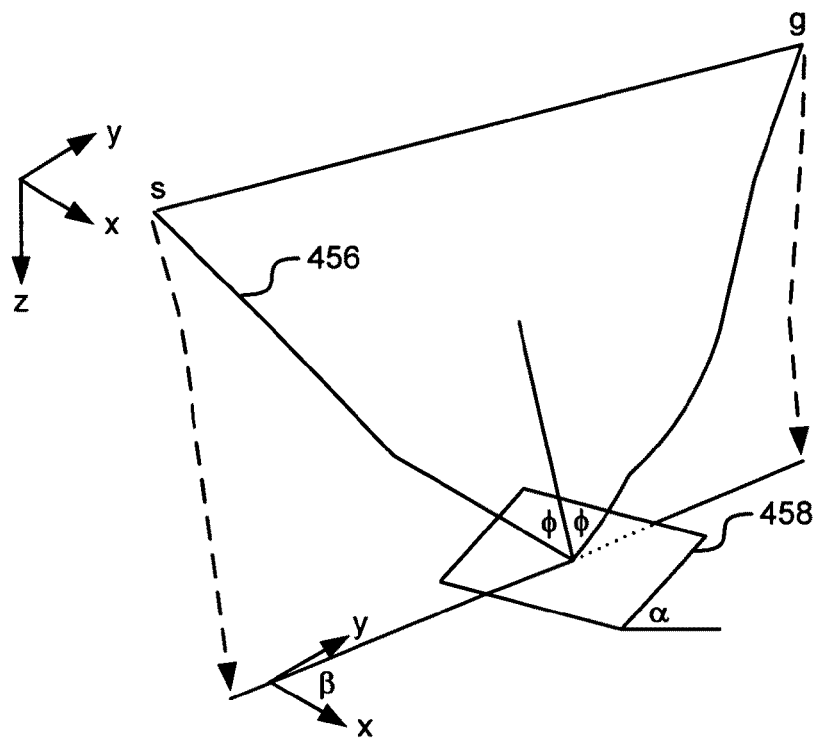
FIG. 19 illustrates an incidence angle, a dip angle, and an azimuth angle for a seismic reflection.

FIG. 19 illustrates three angles which describe a reflected seismic wave in three dimensions. The geometry of the reflected seismic wave is illustrated as a ray 456 from the source s to the target reflector 458 to the receiver g. In reality, wave propagation may not be describable through ray geometry; the schematic is for illustrative purposes only. The reflector makes an angle $\pi/2-\alpha$ with respect to the z axis; $\alpha$ is called the dip angle. The angle at the reflector made between the downgoing ray and the upgoing ray is $2\phi$; $\phi$ is called the incidence angle. Finally, at the reflector, the azimuth angle is $\beta$. At earth's surface the azimuth angle is the angle between the source and receiver location, relative to the x axis. As the analysis point is moved closer and closer to the reflector, the azimuth angle changes.

Figure 20:
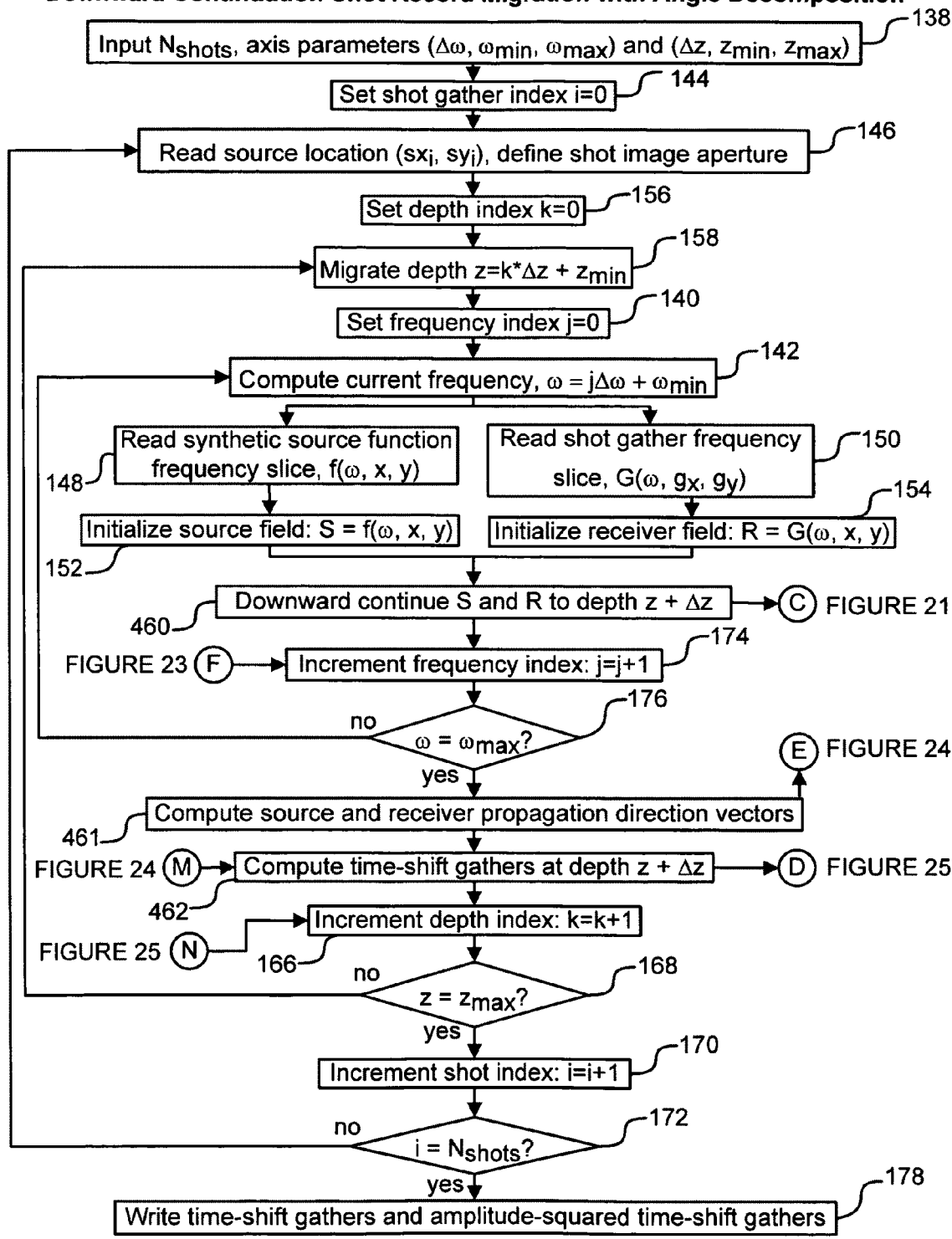
FIG. 20 illustrates downward continuation shot record migration with angle decomposition.

FIG. 20 illustrates downward continuation shot record migration with angle decomposition that uses propagation angles to generate time-shift gathers.

Steps 138-158 were described in FIG. 6 except now the order of loops over source, depth, and frequency changes. The source loop beginning at step 146 and ending at step 172 becomes the outer loop, the depth loop beginning at step 158 and ending at step 168 becomes the middle loop, and the frequency loop beginning at step 142 and ending at step 176 becomes the inner loop.

Figure 21:
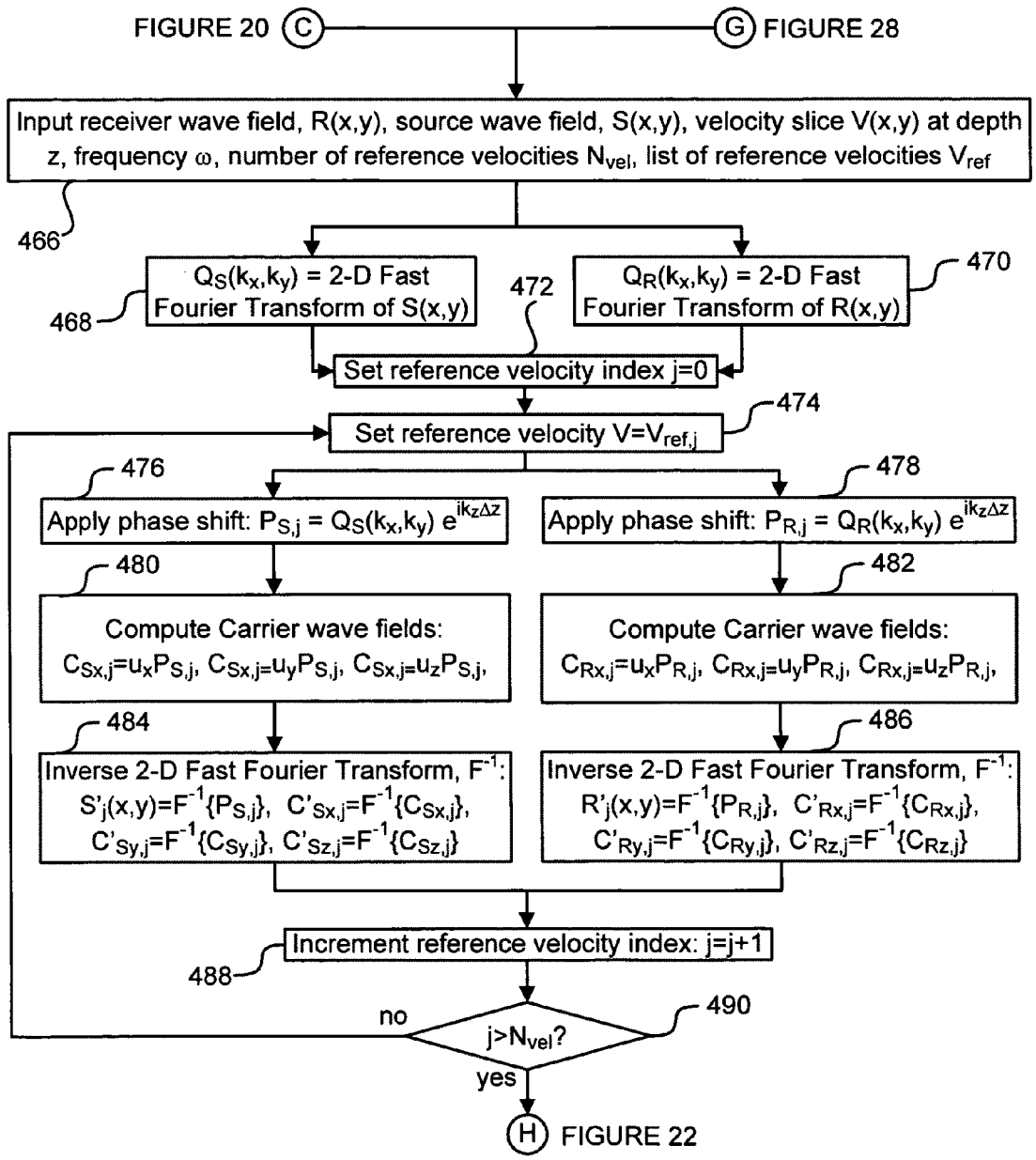
FIG. 21 illustrates the downward continuation portion of phase shift plus interpolation (PSPI).
Figure 24:
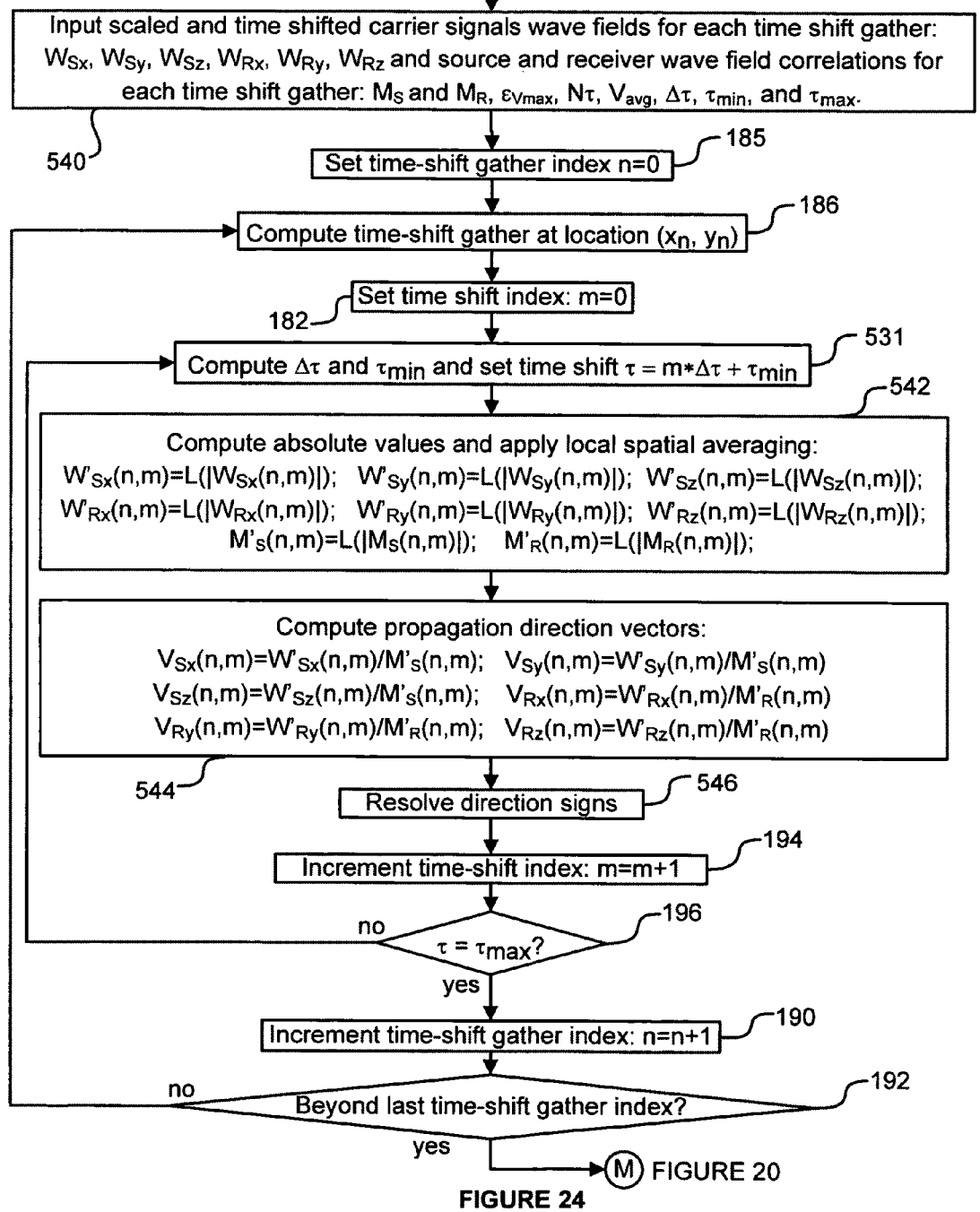
FIG. 24 illustrates the computation of propagation direction vectors for time-shift gathers.
Figure 25:
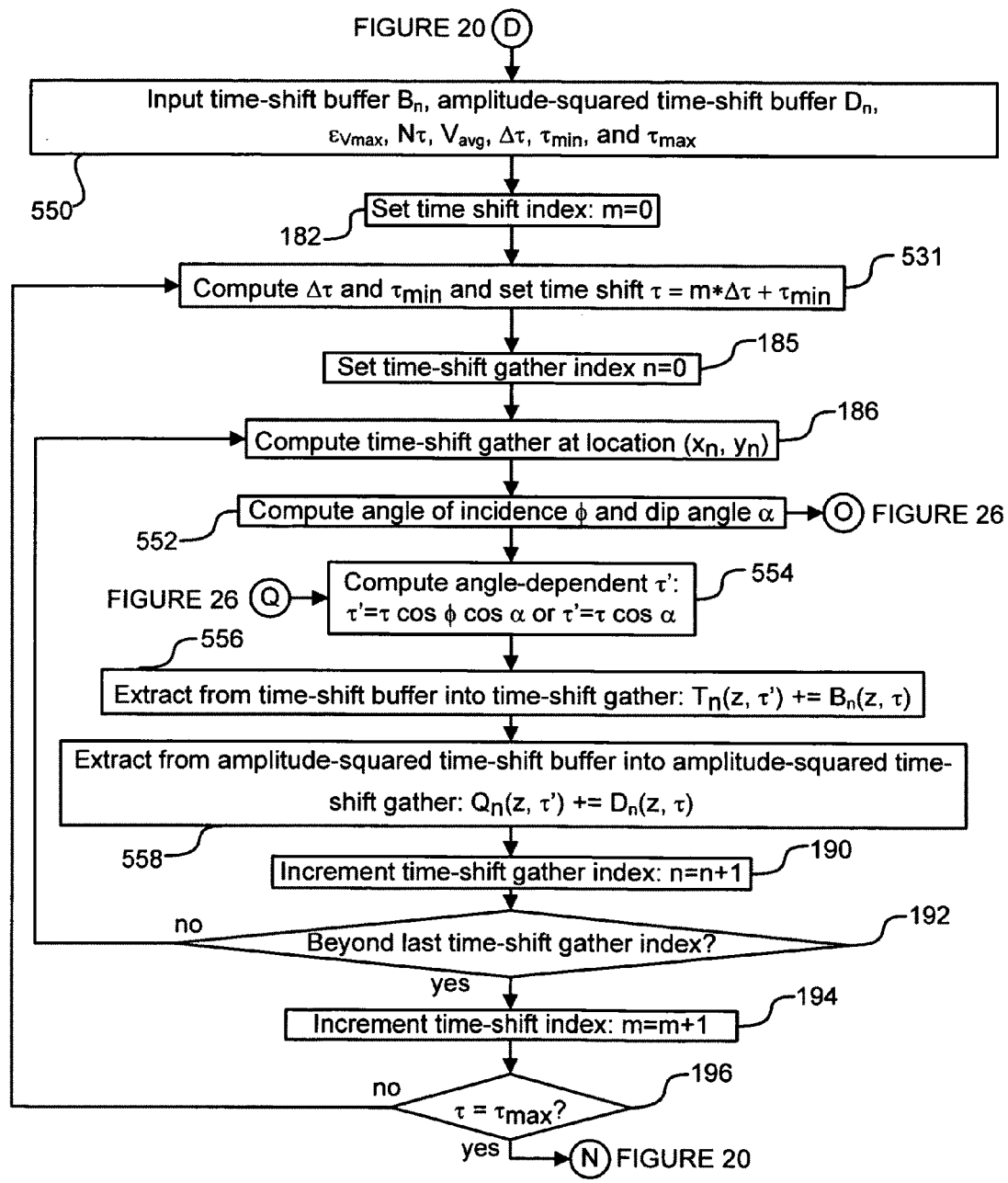
FIG. 25 illustrates computation of a collection of angle-dependent time-shift gathers.

At step 460, the method downward continues the source and receiver wave fields to depth $z+\Delta z$ and accumulates propagation direction vector information for the (x,y) locations where time-shift gathers are located as illustrated in FIG. 21. At step 461, the method computes propagation direction vectors as illustrated in FIG. 24. At step 462, the method computes time-shift gathers as illustrated in FIG. 25 using propagation direction vectors to compute incidence and dip angles at the reflector. The method outputs the time-shift gathers and amplitude-squared time-shift gathers at step 178.

Figure 22:
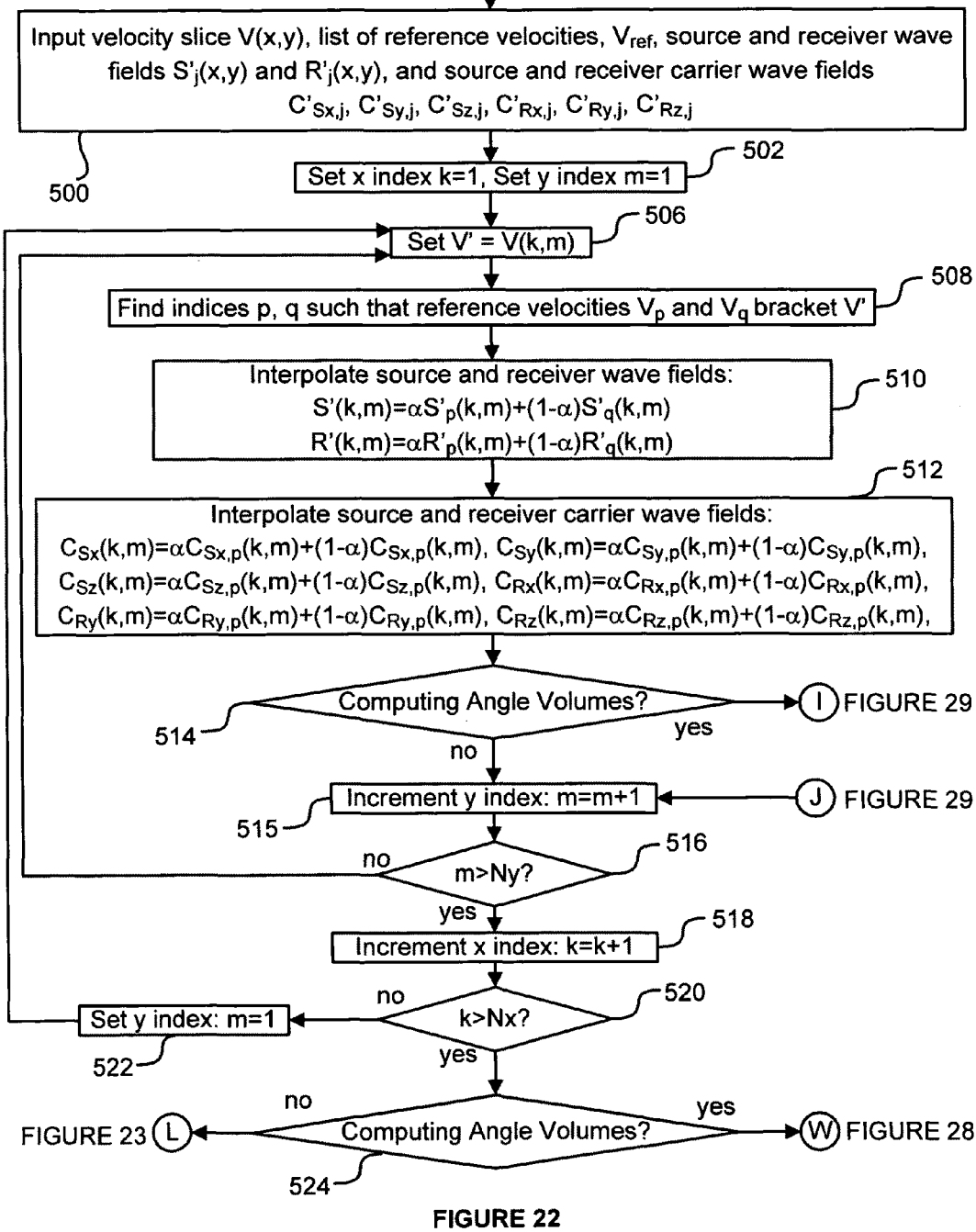
FIG. 22 illustrates the interpolation portion of PSPI.
Figure 23:
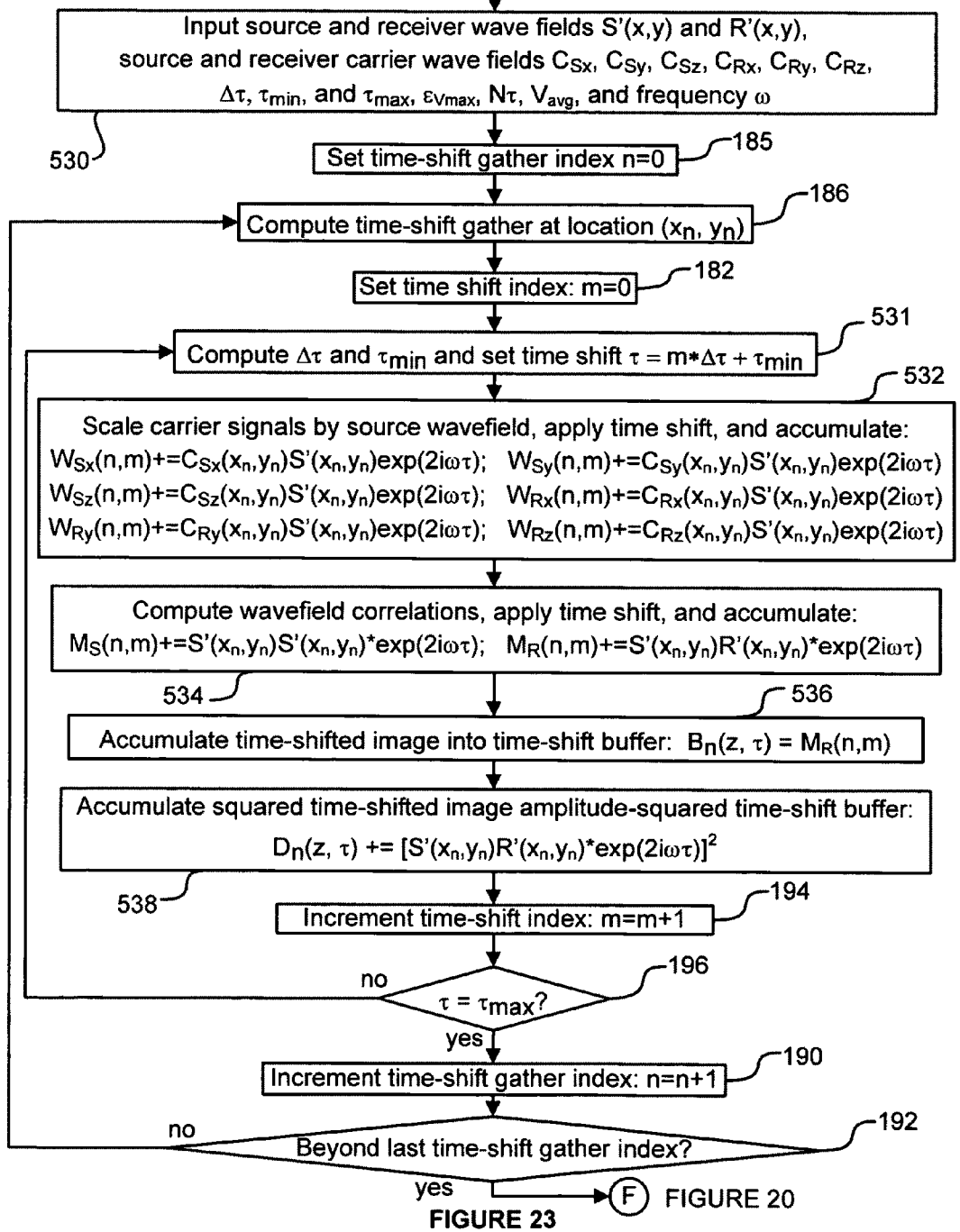
FIG. 23 illustrates the accumulation of angle of propagation information for time-shift gathers.

FIGS. 21-23 illustrate a method of phase shift plus interpolation (PSPI) to downward continue the source and receiver wave fields. Gazdag and Sguazzero, *Migration of seismic data by phase-shift plus interpolation*, Geophysics, v. 49, p. 124 (1984), which is incorporated by reference, describe the background and details of PSPI. The method encodes propagation direction information into carrier wave fields in the Fourier domain where the information is accurately measured. The method then transforms the carrier wave fields back to the space domain where the encoded propagation direction information is decoded. The method accumulates the propagation direction information into the host(s) memory and transforms the information into propagation direction vectors as illustrated in FIG. 24.

FIG. 21 illustrates using the phase shift portion of PSPI to downward continue the source and receiver wave fields. The method starts from either the method of FIG. 20 or the method of FIG. 28. At step 466, the method inputs the receiver wave field R (x,y), the source wave field S (x,y), a velocity slice V (x,y) at depth z, the frequency $\omega$, the number of reference velocities $N_{vel}$ and a list of reference velocities $V_{ref}$. At steps 468 and 470, the method transforms the source and receiver wave fields with a Fast Fourier Transform (FFT) algorithm such as the FFT-W software described in Frigo and Johnson, *FFTW: An adaptive software architecture for the FFT*, Proc. 1998 IEEE Intl. Conf. Acoustics Speech and Signal Processing, vol. 3, pp. 1381-1384, which is incorporated by reference. The FFT-W software may be downloaded from www-.fftw.org.

At step 472, the method sets a reference velocity index j=0. At step 474, the method selects the jth reference velocity from the list $V_{ref}$. At step 476, the method phase shifts a Fourier-Transformed source wave field Qs using the vertical wave number $k_z$, which is a function of the horizontal wave numbers $k_x$ and $k_y$, the frequency $\omega$, and the reference velocity:

$$k_z = \sqrt{\frac{\omega^2}{V^2} - k_x^2 - k_y^2}.$$

At step 478, the method phase shifts the Fourier-Transformed receiver wave field $Q_R$ in the same manner. At steps 480 and 482, the method forms six carrier wave fields by multiplying the Fourier-Transformed source and receiver wave fields computed at steps 476 and 478 by the following quantities:

$$u_x = \frac{V}{\omega}k_x, \; u_y = \frac{V}{\omega}k_y, \; u_z = \frac{V}{\omega}k_z. \tag{19}$$

At steps 484 and 486, the method inverse FFT's all the Fourier-Transformed wave fields. At step 488, the method increments the reference velocity index j. If the reference velocity index j exceeds $N_{vel}$ at step 490, the method performs the method of FIG. 22. If not, the method returns to step 474.

FIG. 22 illustrates a method to perform the interpolation portion of PSPI on the source and receiver wave fields and on the carrier wave fields illustrated in FIG. 21. At step 500, the method inputs a velocity slice V (x,y), a list of reference velocities $V_{ref}$ a collection of source and receiver wave fields for each reference velocity, and a collection of carrier wave fields corresponding to the source and receiver wave fields for each reference velocity obtained in the method of FIG. 21.

At step 502, the method sets the x index k=1 and sets the y index m=1. At step 506, the method sets variable V' with the value of the velocity slice V (x,y) at index k and index m. At step 508, the method finds reference velocity indices p and q such that reference velocity $V_p$ is less than or equal to V' and the reference velocity $V_g$ is greater than or equal to V'.

At step 510, the method interpolates between the downward continued source and receiver wave fields corresponding to reference velocities p and q, producing interpolated source and receiver wave fields S' and R' at depth $z+\Delta z$ for (x,y) indices k and m. The method defines the interpolation weight $\alpha$ as follows:

$$\alpha = \frac{\frac{1}{(V')^2} - \frac{1}{V_q^2}}{\frac{1}{V_p^2} - \frac{1}{V_q^2}}. \tag{20}$$

The method's value for $\alpha$ causes the interpolated wave field to satisfy the known scalar wave equation at the initial depth z. At step 512, the source and receiver carrier wave fields corresponding to reference velocities p and q are interpolated for (x,y) indices k and m using the value of $\alpha$, producing interpolated source and receiver carrier wave fields $C_{Sx}$, $C_{Sy}$, $C_{Sz}$, $C_{Rz}$, $C_{Ry}$, and $C_{Rz}$ at depth $z+\Delta z$. At step 514, the method determines if it is computing angle volumes. If so, the method proceeds to the method illustrated in FIG. 29. If not, the method proceeds to step 515. In either case, the method increments the y index m at step 515. At step 516, if index m exceeds the number of y grid points $N_y$, the method proceeds to step 518. If not, the method repeats steps 506 to 515 for the next (x,y) location. At step 518, the method increments the index k. At step 520, if index k exceeds the number of x grid points $N_x$, the method proceeds to step 524. If not, the method proceeds to step 522, resetting index m to 1, then repeats steps 506 to 518 for the next (x,y) location. At step 524, the method determines if it is computing angle volumes. If yes, the method proceeds to the method illustrated in FIG. 28. If not, the method proceeds to the method illustrated in FIG. 23.

FIG. 23 illustrates the accumulation of angle of propagation information for time-shift gathers. At step 530, the method inputs source and receiver wave fields S'(x,y) and R'(s,y), the source and receiver carrier wave fields $C_{Sx}$, $C_{Sy}$, $C_{Sx}$, $C_{Rx}$, $C_{Ry}$, and $C_{Rz}$, time shift axis parameters $\Delta\tau$, $\tau_{min}$, and $\tau_{max}$, the maximum allowable velocity error $\epsilon_{Vmax}$, number of time shifts $N\tau$, average velocity $V_{avg}$, and frequency $\omega$. At step 185, the method initializes the time-shift gather location index n to 0. At step 186, the method reads the current time-shift gather location $(x_n, y_n)$. The user inputs a list of time-shift gather locations and shot image aperture dimensions at run-time. At step 182, the method initializes the time-shift index m to 0.

At step 531, the method computes the current time shift $\tau$ by the linear relation $\tau=M*\Delta\tau+\tau_{min}$ where $\Delta\tau$ is either a constant value supplied by the user or a depth-variable function of depth z and average velocity $V_{avg}$ at the (x,y) locations of the time-shift gathers. If the user chooses a depth-variable $\tau$, the user must also supply a maximum measurable RMS velocity error $\epsilon_{Vmax}$ as a fraction of RMS migration velocity, and the number of time shifts Ni. The method substitutes $\epsilon_{Vmax}$ into the right side of equation (14) and replaces t with $z/V_{avg}$ in equation (14). The method solves equation (14) for $\tau$ and defines this as $\tau_{min}$. The method then defines $\Delta\tau=2\tau_{min}/N\tau$.

At step 532, the method multiplies each element of the carrier wave fields by the corresponding element in the source wave field and by an exponential time shift and accumulates the result in arrays in the host(s) memory according to the following relationships:

$$W_{Sx}(n,m)+=C_{Sx}(x_n,y_n)S'(x_n,y_n)\exp(2i\omega\tau)$$

$$W_{Sy}(n,m)+=C_{Sy}(x_n,y_n)S'(x_n,y_n)\exp(2i\omega\tau)$$

$$W_{Sz}(n,m)+=C_{Sz}(x_n,y_n)S'(x_n,y_n)\exp(2i\omega\tau)$$

$$W_{Rx}(n,m)+=C_{Rx}(x_n,y_n)S'(x_n,y_n)\exp(2i\omega\tau)$$

$$W_{Ry}(n,m)+=C_{Ry}(x_n,y_n)S'(x_n,y_n)\exp(2i\omega\tau)$$

$$W_{Rz}(n,m)+=C_{Rz}(x_n,y_n)S'(x_n,y_n)\exp(2i\omega\tau)$$

The operator += means add and assign the expression on the right of the equal sign to the expression on the left.

At step 534, the method computes wavefield correlations by multiplying each element of the source and the receiver wave fields with the complex conjugate of the source wave field, and then applies a time shift as follows and accumulates the result $M_s$ and $M_R$ in the host(s) memory as follows:

$$M_S(n,m)+=S'(x_n,y_n)S'(x_n,y_n)*\exp(2i\omega\tau)$$

$$M_R(n,m)+=S'(x_n,y_n)R'(x_n,y_n)*\exp(2i\omega\tau)$$

At step 536, the method accumulates the time-shifted image $M_R$ into time-shift buffer $B_n(z, \tau)$:

$$B_n(z,\tau)=M_R(n,m)$$

At step 538, the method accumulates the squared time-shifted image (right expression below) into the amplitude-squared time-shift buffer (left expression):

$$D_n(z,\tau)+=[S'(x_n,y_n)R'(x_n,y_n)*\exp(2i\omega\tau)]^2$$

At step 194, the method increments the time-shift index. If the method determines that the current time shift $\tau$ exceeds the maximum time-shift $\tau_{max}$ at step 196 the method continues to step 190. At step 190, the method increments the time-shift gather index. At step 192, if the method determines that the time-shift gather index exceeds the last time-shift gather index, the method proceeds to the method illustrated in FIG. 20. If not, the method proceeds to step 186 to compute the next time shift value.

FIG. 24 illustrates a method to compute propagation direction vectors for time-shift gathers. At step 540, the method inputs scaled and time shifted carrier signal wave fields for each time shift gather: $W_{Sx}$, $W_{Sy}$, $W_{Sz}$, $W_{Rx}$, $W_{Ry}$, $W_{Rz}$ and source and receiver wave field correlations for each time shift gather: $M_s$ and $M_R$, the maximum allowable velocity error $\epsilon_{Vmax}$, number of time shifts $N\tau$, average velocity $V_{avg}$, and time shift axis parameters $\Delta\tau$, $\tau_{min}$, and $\tau_{max}$.

At step 185, the method initializes the time-shift gather location index n to 0. At step 186, the method reads the current time-shift gather location $(x_n, y_n)$. The user inputs a list of time-shift gather locations and shot image aperture dimensions at run-time. At step 182, the method initializes the time-shift index m to 0. At step 531, the method computes the current time shift $\tau$ by the linear relation $\tau=m*\Delta\tau+\tau_{min}$ as described by the method illustrated by FIG. 23.

At step 542, the method computes the absolute values of the eight fields ($W_{Sx}$, $W_{Sy}$, $W_{Sz}$, $W_{Rx}$, $W_{Ry}$, $W_{Rz}$, $M_S$, and $M_R$) and then applies a local spatial average operator L to each of the fields:

$$W'_{Sx}(n,m)=L(|W_{Sx}(n,m)|)$$

$$W'_{Sy}(n,m)=L(|W_{Sy}(n,m)|)$$

$$W'_{Sz}(n,m)=L(|W_{Sz}(n,m)|)$$

$$W'_{Rx}(n,m)=L(|W_{Rx}(n,m)|)$$

$$W'_{Ry}(n,m)=L(|W_{Ry}(n,m)|)$$

$$W'_{Rz}(n,m)=L(|W_{Rz}(n,m)|)$$

$$M'_S(n,m)=L(|M_S(n,m)|)$$

$$M'_R(n,m)=L(|M_R(n,m)|)$$

At step 544, the method computes propagation direction vectors using the fields computed at step 542 as follows:

$$V_{Sx}(n,m)=W'_{Sx}(n,m)/M'_S(n,m)$$

$$V_{Sy}(n,m)=W'_{Sy}(n,m)/M'_S(n,m)$$

$$V_{Sz}(n,m)=W'_{Sz}(n,m)/M'_S(n,m)$$

$$V_{Rx}(n,m)=W'_{Rx}(n,m)/M'_R(n,m)$$

$$V_{Ry}(n,m)=W'_{Ry}(n,m)/M'_R(n,m)$$

$$V_{Rz}(n,m)=W'_{Rz}(n,m)/M'_R(n,m)$$

At step 546, the method resolves the sign of the direction vectors. This is necessary because direction information is lost in the absolute value computation at step 542. At step 194, the method increments time-shift index: m=m+1. At step 194, the method increments the time-shift index. If the method determines that the current time shift τ exceeds the maximum time-shift index $\tau_{max}$ at step 196 the method continues to step 190. At step 190, the method increments the time-shift gather index. At step 192, if the method determines that the time-shift gather index exceeds the last time-shift gather index, the method proceeds to the method illustrated in FIG. 20. If not, the method proceeds to step 186 to compute the next time shift value.

FIG. 25 illustrates a method to compute a collection of angle-dependent time-shift gathers. FIG. 25 is similar to FIG. 7, except incidence angle and dip angle information improves accuracy of the time-shift gather used to update the migration velocity. At step 550, the method inputs time-shift buffer $B_n$ and the amplitude-squared time-shift buffer $D_n$ obtained from the method of FIG. 24, the axis parameters $\tau_{max}, \tau_{min}$, and $\Delta\tau$ defining the time shift axis from a user, the maximum allowable velocity error $\epsilon_{Vmax}$, number of time shifts Nτ, and average velocity $V_{avg}$.

The method continues at step 182, previously described in connection with FIG. 7. The method then proceeds to step 531, previously described in connection with FIG. 23. The method continues at steps 185-186, previously described in connection with FIG. 7. At step 552, the method computes incidence angle φ and dip angle α according to the method illustrated in FIG. 26. At step 554, the method uses the incidence angle φ and dip angle α to compute an angle-dependent time shift variable τ'. The user chooses at step 554 whether to apply a dip angle and incidence angle correction (cos φ cos α) or a dip angle-only correction (cos α).

In an embodiment, the method defines an angle-dependent time shift, τ'=τ cos α. The method then replaces τ with τ' in the left hand side of equations (14), (17), or (18). Furthermore, by using τ', the method replaces travel time t with vertical travel time $t_v$ in equations (14), (17), or (18), which is convenient for implementation.

In another embodiment, equations (14), (17), and (18) contain terms of the form τ/t, where τ is the time shift variable and t is the travel time from source to reflector to receiver. In the implementation of equations (14), (17), and (18), the travel time t is approximated with a vertical travel time $t_v$ or the time obtained by performing a 1D depth-to-time conversion of a reflector. For implementation purposes, vertical travel time $t_v$ is more convenient to use than travel time t. The method uses the following equation to relate travel time t, normal incidence travel time $t_0$, and incidence angle φ:

$$\cos\varphi = \frac{t_0}{t}. \quad (21)$$

The method uses trigonometric relations to relate normal incidence travel time $t_0$ to vertical travel time $t_v$, using the dip angle α:

$$t_0 = \frac{t_v}{\cos\alpha}. \quad (22)$$

The method combines equations (21) and (22) to relate travel time t to vertical travel time $t_v$:

$$t = \frac{t_v}{\cos\alpha\cos\phi}. \quad (23)$$

The method inserts equation (23) into equations (14), (17), and (18) to obtain improved equations relating time shift τ to velocity error Δv. The method generates a angle-dependent time shift, τ', which is defined as:

$$\tau'=\tau \cos\alpha \cos\phi. \quad (24)$$

Therefore, by replacing τ with τ' at step 554, the method handles dependence on dip angle and incidence angle without modifying the right hand side of equations (14), (17), or (18). Furthermore, by using τ', the method defines equations (14), (17), or (18) in terms of vertical travel time $t_v$, which is convenient for implementation. The method rewrites equation (14):

$$\frac{\tau'}{t_v} = -1 + \sqrt{1 + \frac{2\frac{\Delta v(t)}{v(t)}\left(1 - \frac{\Delta v(t)}{2v(t)}\right)}{\left(1 - \frac{\Delta v(t)}{v(t)}\right)^2}}, \quad (25)$$

rewrites equation (17):

$$\frac{\tau'}{t_v} = \frac{\Delta v(t)}{v(t)}\left(1 + \frac{\Delta v(t)}{v(t)}\right), \quad (26)$$

and rewrites equation (18):

$$\frac{\Delta v(t)}{v(t)} \approx \frac{\tau'}{t_v}. \quad (27)$$

At step 556, the method adds the time-shift buffer $B_n(z,\tau)$ into the time-shift gather $T_n(z,\tau')$. At step 558, the method adds the amplitude-squared time-shift buffer $D_n(z,\tau)$ into the amplitude-squared time-shift gather $Q_n(z,\tau')$. Steps 190, 192, 194, and 196 were previously described in FIG. 7. After step 196, the method returns to the method illustrated in FIG. 20.

Figure 26:
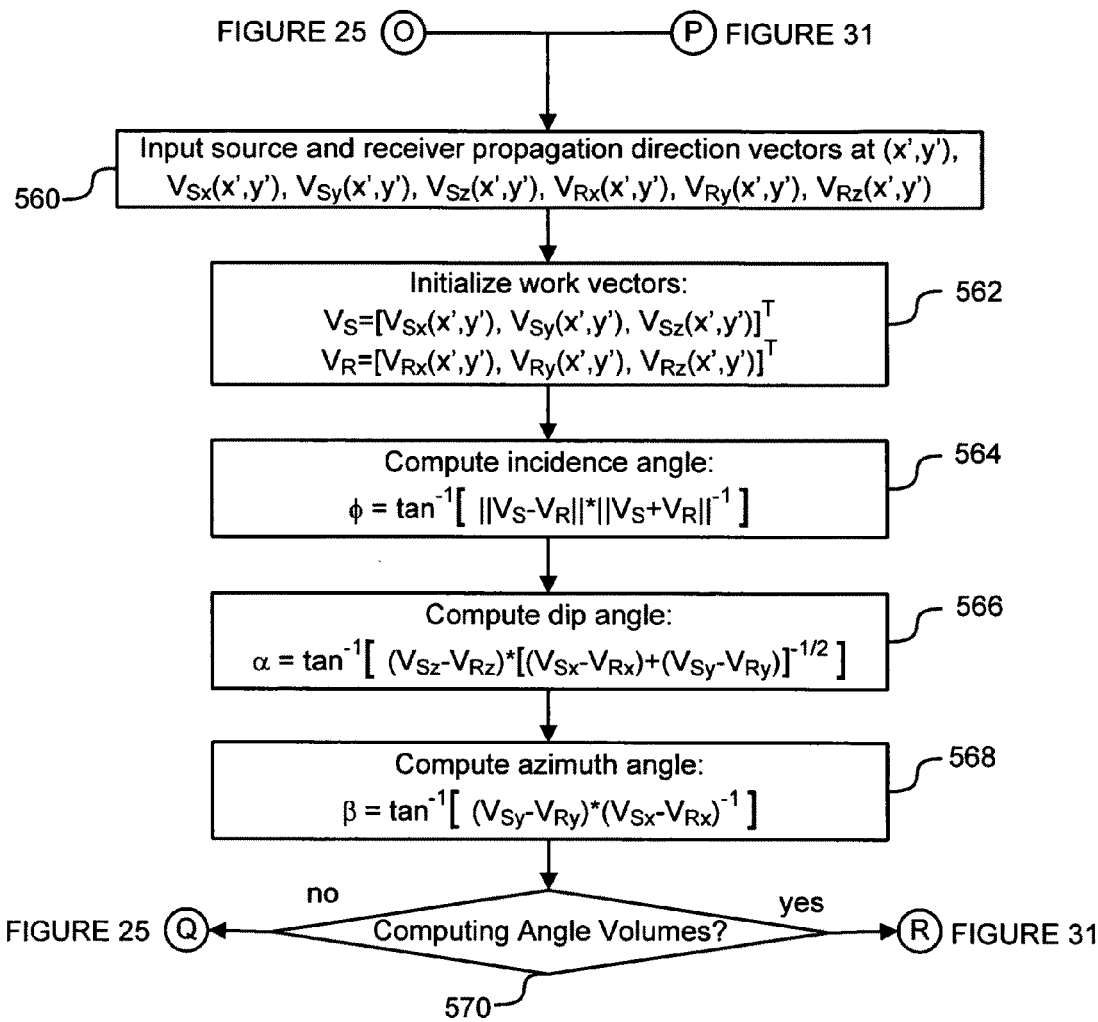
FIG. 26 illustrates computing an incidence angle, a dip angle, and an azimuth angle from propagation direction vectors.

FIG. 26 illustrates a method to use propagation direction vectors to compute incidence angle, dip angle, and azimuth angle. The method starts from either the method of FIG. 25 or the method of FIG. 31. At step 560, the method inputs source and receiver propagation direction vectors at a given position (x',y'): $V_{Sx}(x',y')$, $V_{Sy}(x',y')$, $V_{Sz}(x',y')$, $V_{Rx}(x',y')$, $V_{Ry}(x',y')$, $V_{Rz}(x',y')$.

At step 562, work vectors $V_s$ and $V_R$ are initialized:

$$v_S=[V_{Sx}(x',y'),V_{Sy}(x',y'),V_{Sz}(x',y')]^T$$

$$v_R=[V_{Rx}(x',y'),V_{Ry}(x',y'),V_{Rz}(x',y')]^T$$

At step 564, the work vectors $V_s$ and $V_R$ are used to compute the incidence angle φ according to the relation:

$$\varphi = \tan^{-1}\left[\frac{\|V_S - V_R\|}{\|V_S + V_R\|}\right]. \quad (28)$$

At step 566, the method uses individual components of the propagation direction vectors to compute the dip angle α according to the relation:

$$\alpha = \tan^{-1}\left[\frac{V_{Sz} - V_{Rz}}{\sqrt{(V_{Sx} - V_{Rx})^2 + (V_{Sy} - V_{Ry})^2}}\right]. \quad (29)$$

At step 568, the method uses individual components of the propagation direction vectors to compute the azimuth angle β according to the relation:

$$\beta = \tan^{-1}\left[\frac{V_{Sy} - V_{Ry}}{(V_{Sx} - V_{Rx})}\right]. \quad (30)$$

At step 570, the method determines if it is computing angle volumes. If yes, the method proceeds to the method illustrated in FIG. 31. If not, the method proceeds to the method illustrated in FIG. 25.

Figure 27:
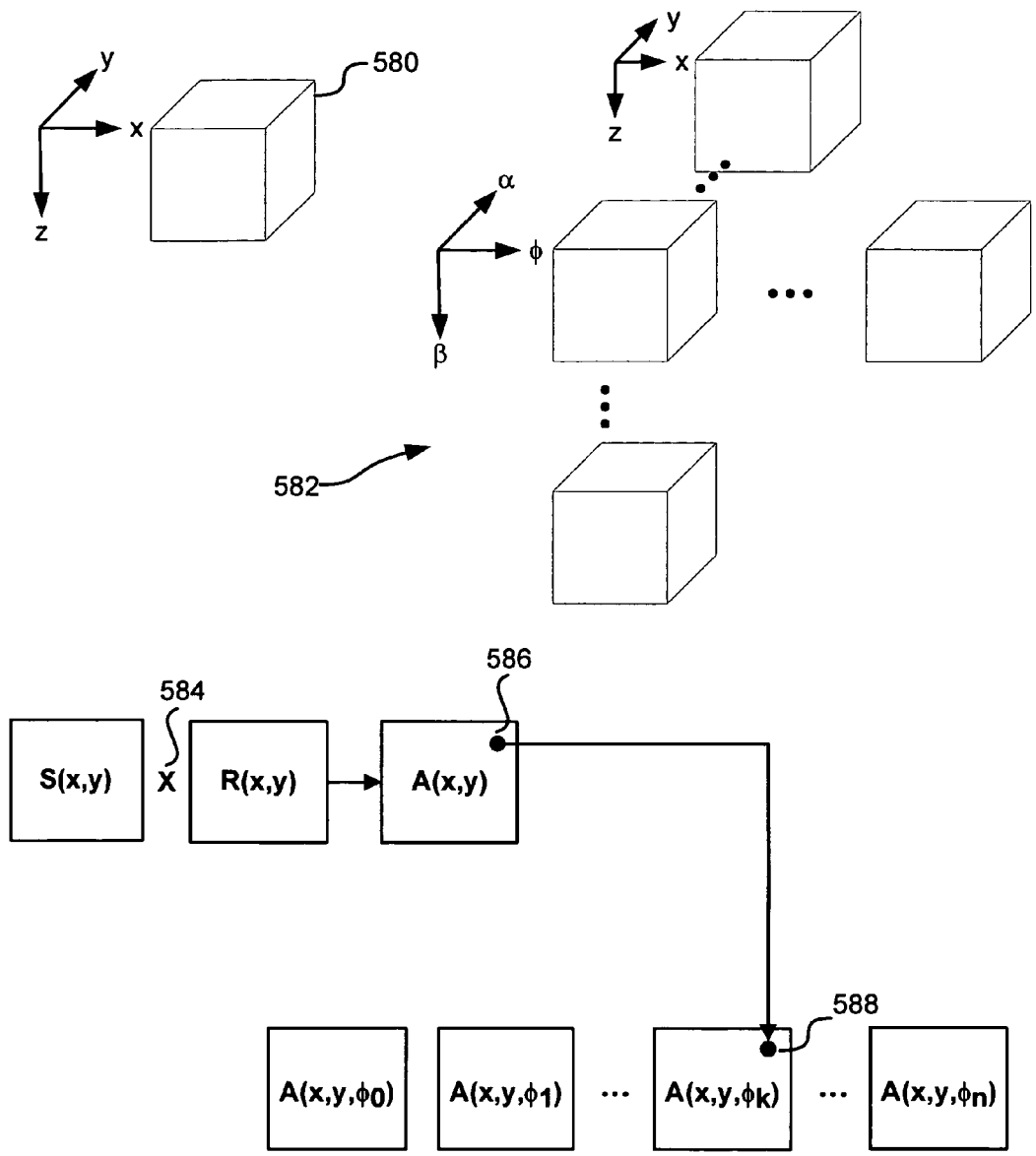
FIG. 27 illustrates using propagation angles to generate angle volumes.

FIG. 27 illustrates using propagation angles to generate angle volumes. Three-dimensional image 580 is a function of (x,y,z). Each of the plurality of angle volumes 582 is also a function of (x,y,z). As shown, three propagation vectors (i.e., incidence angle φ, dip angle α, and azimuth angle β) result in three dimensions of angle volumes.

To compute a three-dimensional image as a function of the propagation angles we need to map points in an image volume into points in the angle volumes, which is described in detail in FIGS. 28-31.

Figure 31:
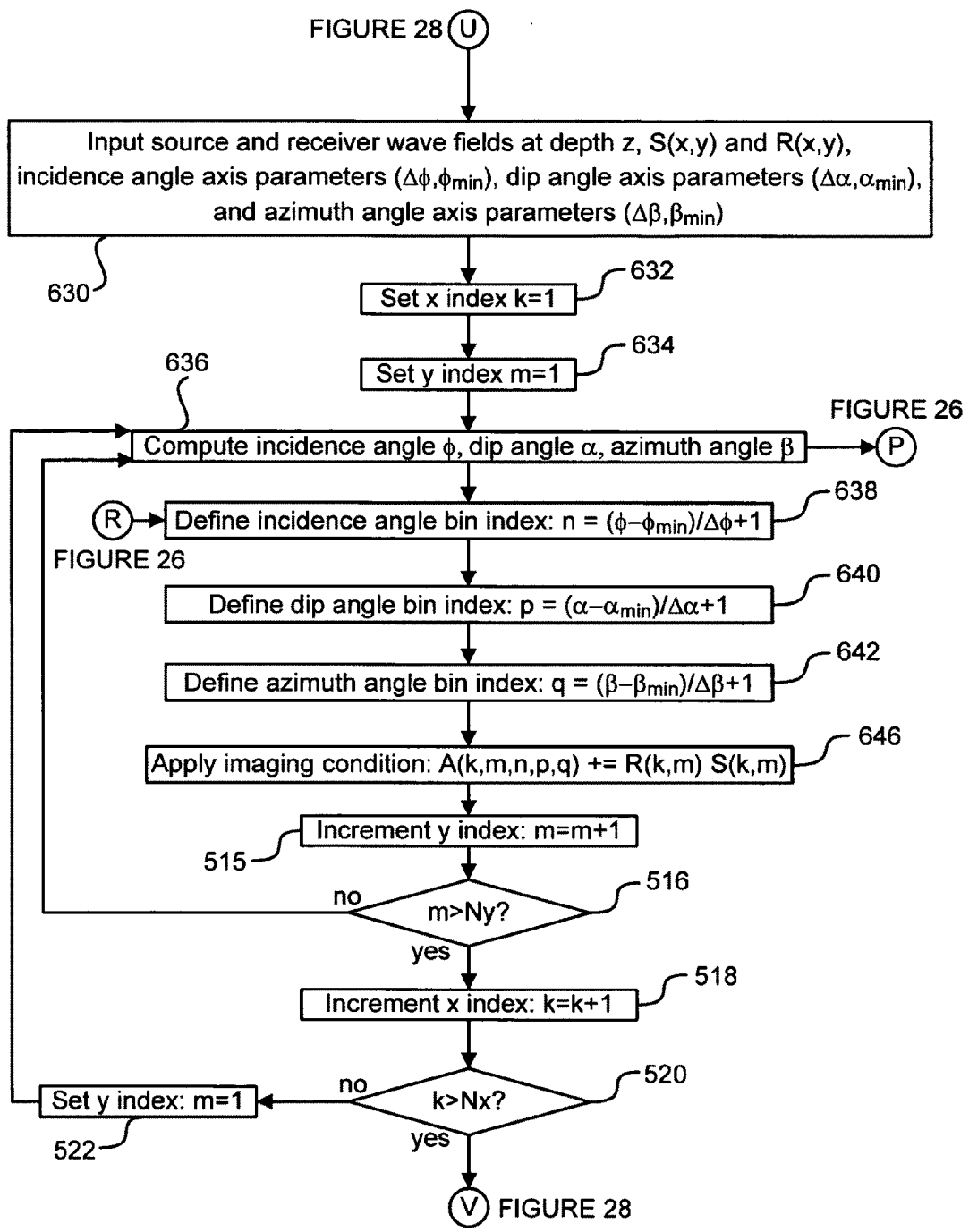
FIG. 31 illustrates computing a collection of angle image volumes.

FIG. 27 illustrates the mapping for the incidence angle φ only. A correlation imaging condition 584 is applied to an interpolated source wavefield S(x,y) and an interpolated receiver wavefield R(x,y). FIG. 31 illustrates how the condition is applied. This produces an image slice A(x,y).

The method defines a plurality of angle volume slices $A(x,y,\phi_k)$ where index k refers to an angle range defined by the user. For instance, k=0 could represent the angle range φ=0-10°. An incidence angle φ is computed at (x,y) point 586, and defines the index k of the corresponding angle volume. As shown, the method adds the image amplitude at point 586 in image slice A(x,y) to the point 588 of the plurality of angle volume slices $A(x,y,\phi_k)$.

Figure 28:
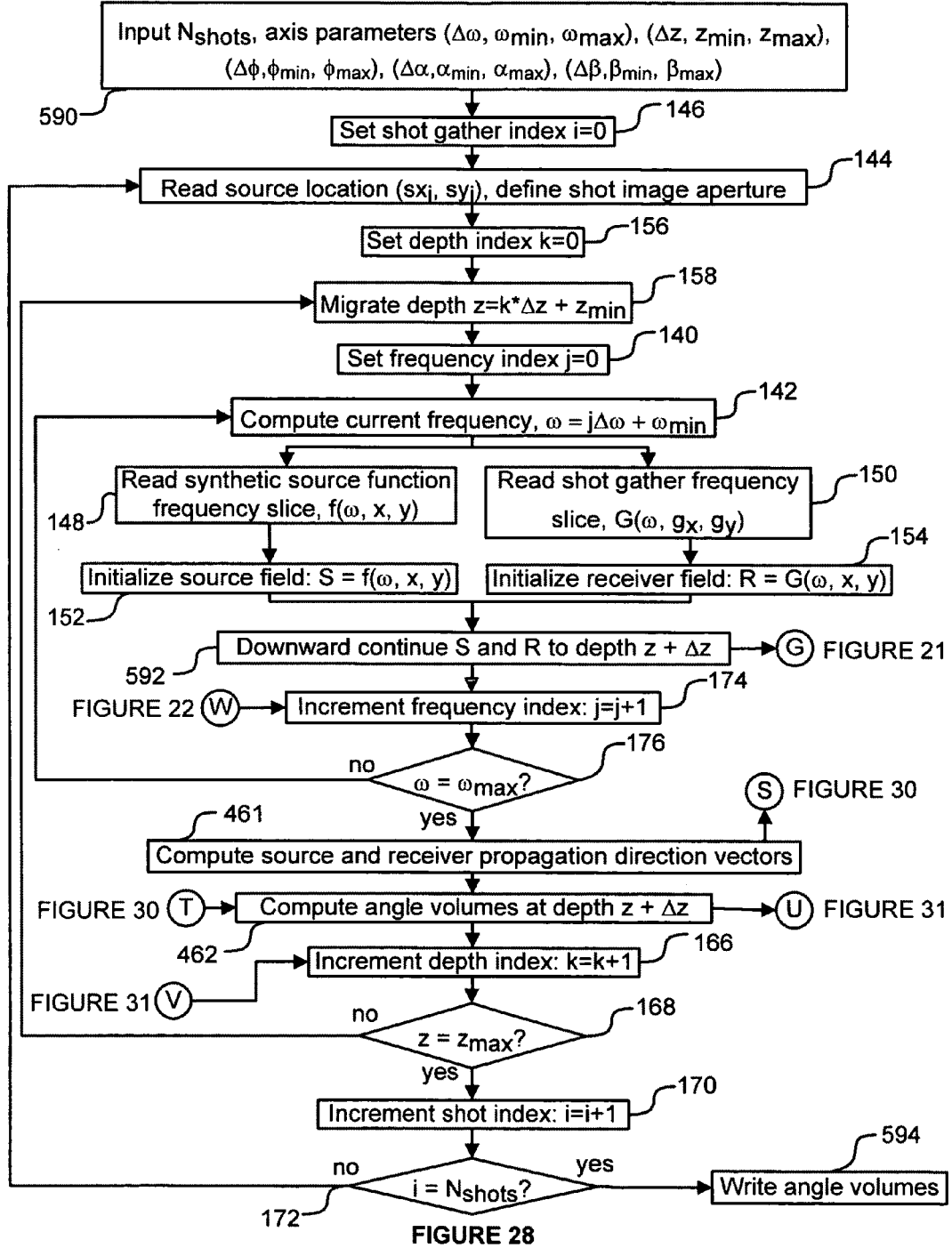
FIG. 28 illustrates computation of downward continuation shot record migration angle volumes.

FIG. 28 illustrates a method to compute angle volumes from downward continuation shot record migration. The method uses the angle information to generate fully-populated images decomposed by incidence angle, dip angle, and/or azimuth angle. At step 590, the method inputs the number of shots $N_{shots}$, and axis parameters (grid spacing, minimum coordinate, maximum coordinate) for frequency (Δω, $\omega_{min}$, $\omega_{max}$), depth (Δz, $z_{min}$, $z_{max}$), incidence angle (Δφ, $\phi_{min}$, $\phi_{max}$), dip angle (Δα, $\alpha_{min}$, $\alpha_{max}$), and azimuth angle (Δβ, $\beta_{min}$, $\beta_{max}$). For instance, if a user desires incidence angle volumes every 10 degrees from 0 to 60 degrees, Δφ would be set to 10, $\phi_{min}$ to 0, and $\phi_{max}$ to 60, and the method outputs six angle volumes.

Figure 30:
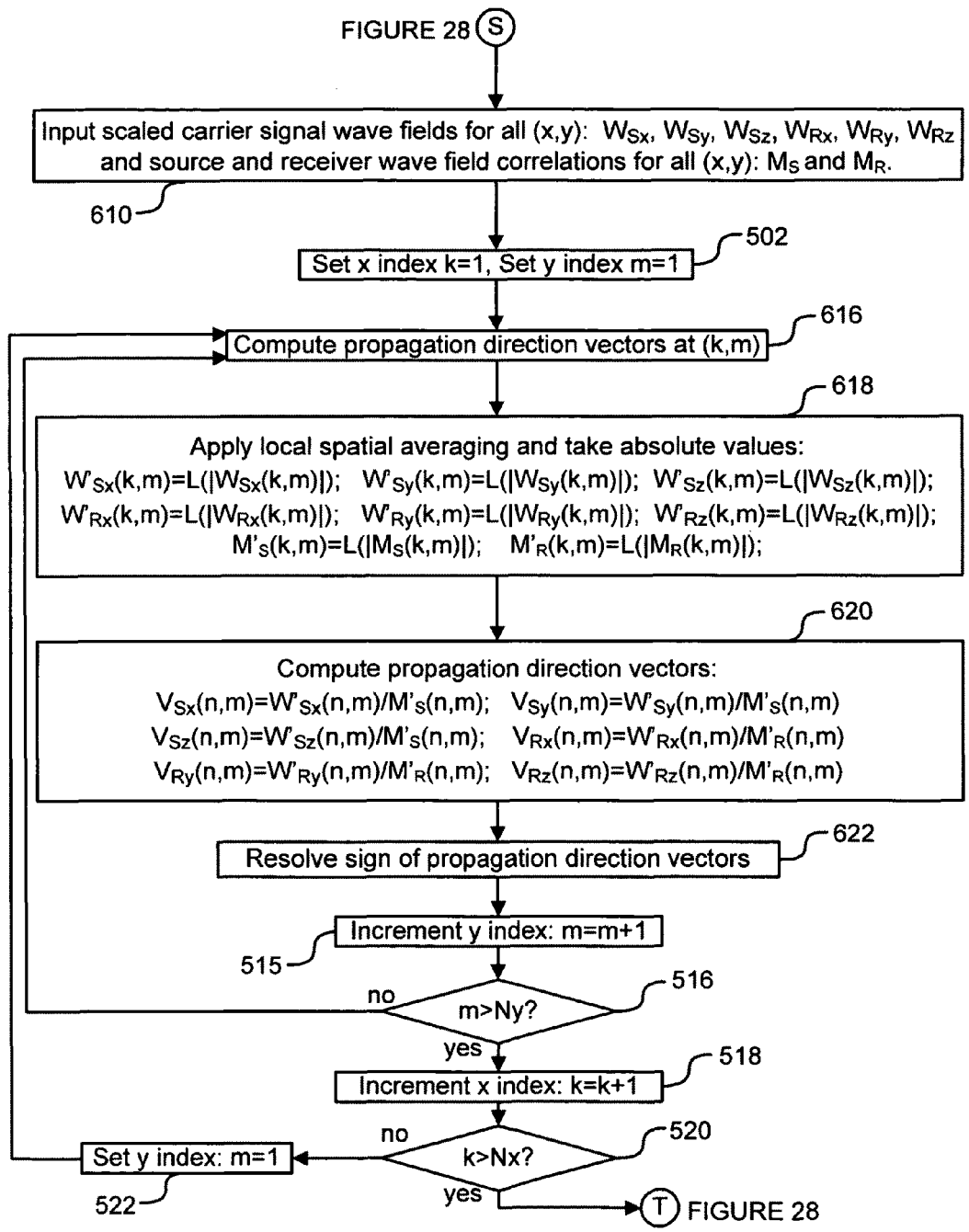
FIG. 30 illustrates the computation of propagation direction vectors for angle volumes.

The method performs steps 140-158 and steps 166-176, previously illustrated by the method described in FIG. 20. At step 592, the method downward continues the source wave field S and receiver wave field R to depth z+Δz and accumulates propagation direction vector information as illustrated in FIG. 21. At step 461, the method computes propagation direction vectors as illustrated in FIG. 30. At step 462, the method computes angle volumes as illustrated in FIG. 31 using propagation direction vectors to compute incidence angle φ, dip angle α, and azimuth angle β at the reflector. At step 594, the method writes a file containing the angle volumes.

Figure 29:
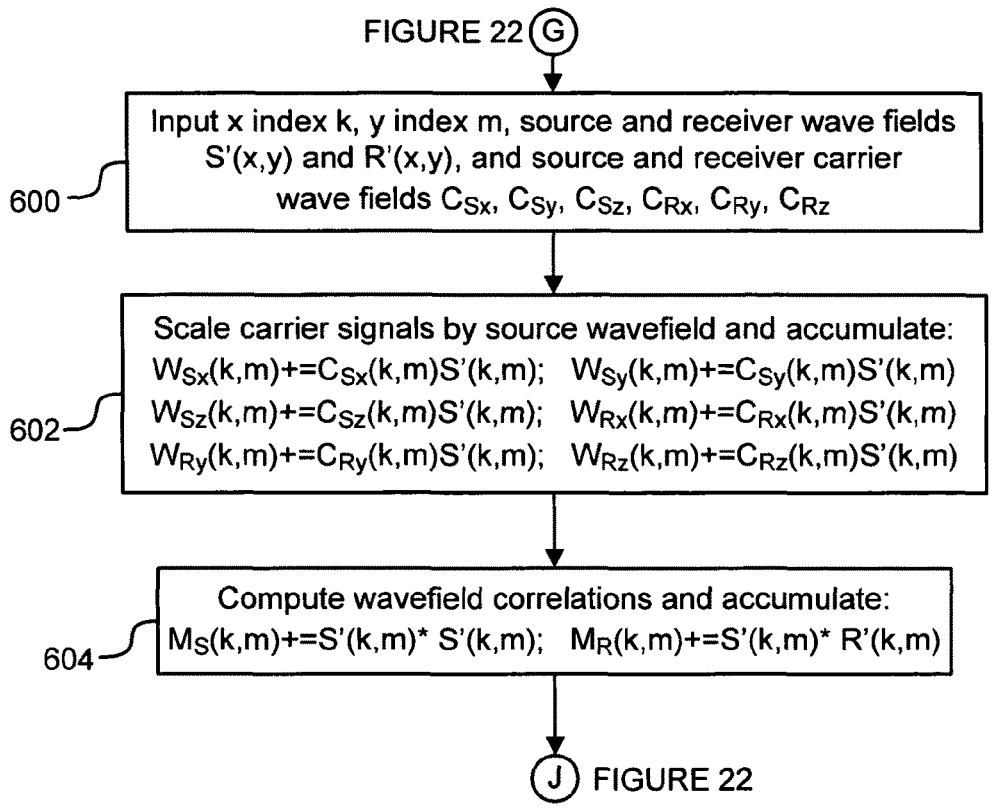
FIG. 29 illustrates the accumulation of angle of propagation information for angle volumes.

FIG. 29 illustrates the accumulation of angle of propagation information for angle volumes. At step 600, the method inputs an x index k, a y index m, source and receiver wave fields S'(x,y) and R'(s,y), and the source and receiver carrier wave fields $C_{Sx}$, $C_{Sy}$, $C_{Sz}$, $C_{Rx}$, $C_{Ry}$, and $C_{Rzx}$.

At step 602, the method multiplies each element of the carrier wave fields by the corresponding element in the source wave field and accumulates the result in arrays in the host(s) memory according to the following relationships:

$$W_{Sx}(k,m) += C_{Sx}(k,m)S'(k,m)$$

$$W_{Sy}(k,m) += C_{Sy}(k,m)S'(k,m)$$

$$W_{Sz}(k,m) += C_{Sz}(k,m)S'(k,m)$$

$$W_{Rx}(k,m) += C_{Rx}(k,m)S'(k,m)$$

$$W_{Ry}(k,m) += C_{Ry}(k,m)S'(k,m)$$

$$W_{Rz}(k,m) += C_{Rz}(k,m)S'(k,m)$$

At step 604, the method computes wavefield correlations by multiplying each element of the source wave field S'(k,m) and the receiver wave field R'(k,m) with the complex conjugate of the source wave field S'(k,m)* and accumulates the result $M_S$ and $M_R$ in the host(s) memory as follows:

$$M_S(k,m) += S'(k,m)*S'(k,m)$$

$$M_R(k,m) += S'(k,m)*R'(k,m)$$

Finally, after step 604, the method proceeds to the method illustrated by FIG. 22.

FIG. 30 illustrates the computation of propagation direction vectors for angle volumes. At step 610, the method inputs scaled carrier signal wave fields for all (x,y): $W_{Sx}$, $W_{Sy}$, $W_{Sz}$, $W_{Rx}$, $W_{Ry}$, $W_{Rz}$, and source and receiver wave field correlations for all (x,y): $M_S$ and $M_R$.

At step 502, the method initializes the x index k=1 and the y index m=1. At step 616, the method computes propagation direction vectors at indices (k,m). At step 618, the method computes the absolute values of the eight fields ($W_{Sx}$, $W_{Sy}$, $W_{Sz}$, $W_{Rx}$, $W_{Ry}$, $W_{Rz}$, $M_S$, and $M_R$). In an embodiment that stabilizes the result, the method can smooth the eight fields by applying a local spatial average operator L such as a known Gaussian spatial averaging filter to each of the fields:

$$W'_{Sx}(n,m) = L(|W_{Sx}(n,m)|)$$

$$W'_{Sy}(n,m) = L(|W_{Sy}(n,m)|)$$

$$W'_{Sz}(n,m) = L(|W_{Sz}(n,m)|)$$

$$W'_{Rx}(n,m) = L(|W_{Rx}(n,m)|)$$

$$W'_{Ry}(n,m) = L(|W_{Ry}(n,m)|)$$

$$W'_{Rz}(n,m) = L(|W_{Rz}(n,m)|)$$

$$M'_S(n,m) = L(|M_S(n,m)|)$$

$$M'_R(n,m) = L(|M_R(n,m)|)$$

At step 620, the method computes propagation direction vectors using the fields computed at step 618 as follows:

$$V_{Sx}(n,m) = W'_{Sx}(n,m)/M'_S(n,m)$$

$$V_{Sy}(n,m) = W'_{Sy}(n,m)/M'_S(n,m)$$

$$V_{Sz}(n,m) = W'_{Sz}(n,m)/M'_S(n,m)$$

$$V_{Rx}(n,m) = W'_{Rx}(n,m)/M'_R(n,m)$$

$V_{Ry}(n,m)=W'_{Ry}(n,m)/M'_R(n,m)$ $V_{Rz}(n,m)=W'_{Rz}(n,m)/M'_R(n,m)$

At step 622, the method resolves the sign of the propagation direction vectors. This is necessary, because direction information is lost in the absolute value computation at step 542. The method assumes that the sign of $V_{Rz}$ and $V_{Sz}$ are positive, and computes the signs of $V_{Rx}$, $V_{Ry}$, $V_{Sx}$, and $V_{Sy}$ by using the relative phase of the x and y components with respect to the z component. In an embodiment that stabilizes the result, the method can smooth the computed phases by applying a local spatial average operator L such as a known Gaussian spatial averaging filter to each of the fields:

$P_{Sx}(n,m)=L(\text{phase}(V_{Sx}(n,m)/V_{Sz}(n,m)))$ $P_{Sy}(n,m)=L(\text{phase}(V_{Sy}(n,m)/V_{Sz}(n,m)))$ $P_{Rx}(n,m)=L(\text{phase}(V_{Rx}(n,m)/V_{Rz}(n,m)))$ $P_{Ry}(n,m)=L(\text{phase}(V_{Ry}(n,m)/V_{Rz}(n,m)))$ If the phases $P_{Sx}(n,m)$, $P_{Sy}(n,m)$, $P_{Rx}(n,m)$, $P_{Ry}(n,m)$ are greater than $\pi/2$, the sign is assumed to be positive. Otherwise, the sign is assumed to be negative. The method then performs steps 515, 516, 518, 520, and 522 as illustrated in FIG. 22.

FIG. 31 illustrates a method to apply an angle-dependent imaging condition to generate angle volumes as illustrated in FIG. 27.

At step 630, the method inputs source and receiver wave fields at depth z, S(x,y) and R(x,y), the incidence angle axis parameters ($\Delta\phi, \phi_{min}$), the dip angle axis parameters ($\Delta\alpha, \alpha_{min}$), and the azimuth angle axis parameters ($\Delta\beta, \beta_{min}$).

At step 632, the method sets the x index k=1. At step 634, the method sets the y index m=1. At step 636, the method computes the incidence angle $\phi$, dip angle $\alpha$, and azimuth angle $\beta$ at (x,y) as illustrated in FIG. 26. At step 638, the method defines an index n corresponding to the incidence angle $\phi$ computed at step 636. At step 640, the method defines an index p corresponding to the dip angle $\alpha$ computed at step 636. At step 642, the method defines an index q corresponding to the azimuth angle $\beta$ computed at step 636. At step 646, the method applies the shot record migration imaging condition previously illustrated in FIG. 27, and adds R(k,m) S(k,m) into a five-dimensional image volume A (k,m,n,p,q). In an embodiment, only one type of angle decomposition is done. For instance, if only incidence angle decomposition is being done, then p and q will always be 1, and the image volume will be three-dimensional. In an alternative embodiment, the angle decomposition is done on a plurality of propagation angles (e.g., incidence angle and azimuth angle). The method then performs steps 515, 516, 518, 520, and 522 as illustrated in FIG. 22, before returning to the shot record migration method illustrated in FIG. 28.

What is claimed:

1. A method in a host of determining the propagation angles of reflected seismic waves, comprising:
   inputting data representing reflected seismic waves in a memory;
   inputting a propagation velocity field in the memory;
   using the propagation velocity field to migrate the data with a downward continuation Fourier domain shot record migration by multiplying, for each frequency, each point of a conjugate of a source wave field with a receiver wave field to obtain a result, then summing the results over all frequencies;
   computing, using a processor that communicates with the memory, propagation direction vectors of the source wave field and the receiver wave field, wherein the source wave field and the receiver wave field are propagated by the downward continuation Fourier domain shot record migration using the data of the reflected seismic waves and the propagation velocity field; and
   transforming the propagation direction vectors into propagation angles of the reflected seismic waves.

2. The method of claim 1, wherein the propagation angles include an incidence angle, a dip angle, and an azimuth angle of the reflected seismic waves.

3. The method of claim 1, wherein computing the propagation direction vectors includes encoding propagation direction information from the source wave field and the receiver wave field into Fourier domain carrier wave fields and decoding propagation direction information in space domain.

4. The method of claim 1, wherein computing the propagation direction vectors Includes interpolating the source wave field, the receiver wave field, and the Fourier domain carrier wave fields in a phase shift plus interpolation downward continuation step.

5. The method of claim 4, wherein computing the propagation direction vectors includes interpolating the source wave field, the receiver wavefield, and the Fourier domain carrier wave fields, and dividing the interpolated Fourier domain carrier wave fields by the magnitude of the interpolated source wave field or the receiver wave field.

6. The method of claim 1, further comprising using the propagation direction vectors to compute the propagation angles of reflected seismic waves.

7. The method of claim 1, wherein the propagation direction vectors are computed at a subsurface reflection point.

8. A method in a host of determining a three-dimensional Image of earth's geology, comprising:
   inputting data representing reflected seismic waves in a memory;
   inputting a propagation velocity field in the memory;
   using the propagation velocity field to migrate the data with a downward continuation Fourier domain shot record migration by multiplying, for each frequency, each point of a conjugate of a source wave field with a receiver wave field to obtain a result, then summing the results over all frequencies;
   computing, using a processor that communicates with the memory, propagation direction vectors of the source wave field and the receiver wave field, wherein the source wave field and the receiver wave field are propagated by the downward continuation Fourier domain shot record migration using the data of the reflected seismic waves and the propagation velocity field;
   transforming the propagation direction vectors into propagation angles of the reflected seismic waves; and
   using the downward continuation Fourier domain shot record migration and the propagation direction vectors to compute a three-dimensional image, wherein an amplitude of the reflected seismic waves and a set of propagation angles is associated with each point in the three-dimensional image.

9. The method of claim 8, further comprising using the downward continuation Fourier domain shot record migration and the propagation direction vectors to apply an angle-dependent imaging condition including inputting axis parameters defining a plurality of angle volumes in the memory, wherein each angle volume represents a range of propagation angles, wherein the propagation angles at each point in the three-dimensional image connects the point to one of the angle volumes, and wherein the amplitude of the reflected seismic waves of each point of the three-dimensional Image is added to the corresponding point of one of the angle-volumes.

10. The method of claim 8, wherein the propagation direction vectors are computed at a subsurface reflection point.

11. A non-transitory computer-readable medium storing program instructions that cause a host to perform steps, comprising:
inputting data representing reflected seismic waves;
inputting a propagation velocity field;
using the propagation velocity field to migrate the data with a downward continuation Fourier domain shot record migration by multiplying, for each frequency, each point of a conjugate of a source wave field with a receiver wave field to obtain a result, then summing the results over all frequencies;
computing propagation direction vectors of the source wave field and the receiver wave field, wherein the source wave field and the receiver wave field are propagated by the downward continuation Fourier domain shot record migration using the data of the reflected seismic waves and the propagation velocity field; and
transforming the propagation direction vectors into propagation angles of reflected seismic waves.

12. The non-transitory computer-readable medium of claim 11, wherein the propagation direction vectors are computed at a subsurface reflection point.

13. A non-transitory computer-readable medium storing program instructions that cause a host to perform steps, comprising:
inputting data representing reflected seismic waves;
inputting a propagation velocity field;
using the propagation velocity field to migrate the data with a downward continuation Fourier domain shot record migration by multiplying, for each frequency, each point of a conjugate of a source wave field with a receiver wave field to obtain a result, then summing the results over all frequencies;
computing propagation direction vectors of the source wave field and the receiver wave field, wherein the source wave field and the receiver wave field are propagated by the downward continuation Fourier domain shot record migration using the data of the reflected seismic waves and the propagation velocity field;
transforming the propagation direction vectors into propagation angles of reflected seismic waves; and
generating a three-dimensional image for each shot record, wherein an amplitude of the reflected seismic waves and a set of propagation angles is associated with each point in the image.

14. The non-transitory computer-readable medium of claim 13, wherein the propagation direction vectors are computed at a subsurface reflection point.

* * * * *